United States Patent
Watanabe

(10) Patent No.: US 7,605,846 B2
(45) Date of Patent: Oct. 20, 2009

(54) IMAGE COMMUNICATION SYSTEM AND AN APPARATUS FOR AND A METHOD OF PROCESSING AN IMAGE

(75) Inventor: Mikio Watanabe, Asaka (JP)

(73) Assignee: Fujifilm Corporation, Tokyo (JP)

( * ) Notice: Subject to any disclaimer, the term of this patent is extended or adjusted under 35 U.S.C. 154(b) by 513 days.

(21) Appl. No.: 11/350,039

(22) Filed: Feb. 9, 2006

(65) Prior Publication Data
US 2006/0125927 A1 Jun. 15, 2006

Related U.S. Application Data

(62) Division of application No. 09/628,546, filed on Jul. 28, 2000, now Pat. No. 7,027,084.

(30) Foreign Application Priority Data

Jul. 30, 1999 (JP) ............................. JP11-216058

(51) Int. Cl.
*H04N 5/232* (2006.01)
(52) U.S. Cl. ............... 348/211.1; 348/207.1; 348/14.13
(58) Field of Classification Search ............ 348/211.99, 348/211.1, 211.2, 14.01, 14.12, 14.13
See application file for complete search history.

(56) References Cited

U.S. PATENT DOCUMENTS

| 5,502,727 A | * | 3/1996 | Catanzaro et al. | ........ 348/14.01 |
| 5,666,159 A | | 9/1997 | Parulski et al. | |
| 5,734,415 A | | 3/1998 | Hwang | |
| 5,737,491 A | | 4/1998 | Allen et al. | |
| 5,760,824 A | | 6/1998 | Hicks, III | |
| 6,104,430 A | * | 8/2000 | Fukuoka | ........... 348/231.6 |
| 6,177,950 B1 | | 1/2001 | Robb | |
| 6,380,967 B1 | * | 4/2002 | Sacca | .............. 348/14.01 |
| 6,618,553 B1 | * | 9/2003 | Shiohara | .............. 386/117 |

FOREIGN PATENT DOCUMENTS

| JP | 5-75871 A | 3/1993 |
| JP | 8-237490 A | 9/1996 |
| JP | 9-307794 A | 11/1997 |
| JP | 9-322114 A | 12/1997 |
| JP | 10-164483 A | 6/1998 |
| JP | 10-304231 A | 11/1998 |
| JP | 11-46331 A | 2/1999 |
| JP | 11-177518 A | 7/1999 |

* cited by examiner

*Primary Examiner*—Lin Ye
*Assistant Examiner*—Gevell Selby
(74) *Attorney, Agent, or Firm*—Birch, Stewart, Kolasch & Birch, LLP.

(57) ABSTRACT

A communication system includes a portable phone and a digital still camera. The user selects an image for transmission, and data indicating a frame number of the selected image is sent from the portable phone to the digital still camera. The portable phone sends a re-size instruction to the digital still camera. The digital still camera re-sizes the image data to reduce a data quantity thereof. The re-sized image data is sent from the digital still camera to the portable phone. The image data is sent from the portable phone via a network to a partner communication system. The image data has a reduced data quantity through the re-sizing and hence can be completely transmitted thereto in a relatively short period of time.

3 Claims, 19 Drawing Sheets

*Fig. 12*

IMAGE: 1280 PIXELS × 960 PIXELS

| COMMUNICATION SPEED | RE-SIZING RATIO (VERTICAL THINNING RATIO × HORIZONTAL THINNING RATIO) | NO. OF PIXELS AFTER RE-SIZING (NO. OF VERTICAL PIXELS × NO. OF HORIZONTAL PIXELS) |
|---|---|---|
| 9600bps | 1/8 × 1/8 | 160 × 120 (THUMB-NAIL) |
| 64Kbps | 1/4 × 1/4 | 320 × 240 |
| 384Kbps | 1/2 × 1/2 | 640 × 480 |
| 2Mbps | WITHOUT THINNING | 1280 × 960 |

*Fig. 13*

IMAGE: 2560 PIXELS × 1920 PIXELS

| COMMUNICATION SPEED | RE-SIZING RATIO (VERTICAL THINNING RATIO × HORIZONTAL THINNING RATIO) | NO. OF PIXELS AFTER RE-SIZING (NO. OF VERTICAL PIXELS × NO. OF HORIZONTAL PIXELS) |
|---|---|---|
| 9600bps | 1/16 × 1/16 | 160 × 120 (THUMB-NAIL) |
| 64Kbps | 1/8 × 1/8 | 320 × 240 |
| 384Kbps | 1/4 × 1/4 | 640 × 480 |
| 2Mbps | 1/2 × 1/2 | 1280 × 960 |

PRINTER ATTRIBUTE

PRINTER MAKER NAME
  ASD CO.
PRINTER MODEL NAME
  PRT-10
VERSION NO.
  Version 2.3
CORRESPONDING COLOR SPACE
  sRGB
CORRESPONDING FORMAT
  JPEG, TIFF, BMP

IMAGE COMMUNICATION SYSTEM AND AN APPARATUS FOR AND A METHOD OF PROCESSING AN IMAGE

This application is a Divisional of application Ser. No. 09/628,546, filed on Jul. 28, 2000, now U.S. Pat. No. 7,027,084 the entire contents of which are hereby incorporated by reference and for which priority is claimed under 35 U.S.C. § 120.

BACKGROUND OF THE INVENTION

1. Field of the Invention

The present invention relates to an image communication system in which an image processing apparatus and a portable phone can communicate data with each other and the portable phone can communicate a call with another portable phone via a telephone line and to an apparatus for and a method of processing an image.

2. Description of Related Art

Improvement of networks makes it possible to transmit image data or graphics data via a telephone line. In such data transmission, the user is charged according to a period of time in which the telephone line is used for the transmission.

Image data generally includes a large amount of data. Transmission of image data via a telephone line is therefore expensive. On a receiver side of the image data, a long period of time is required to receive the data. An apparatus to receive the data is hence long occupied to receive the image data.

In some cases, the device on the receiver side cannot appropriately reproduce an image. Namely, according to the received image data, the device cannot produce an appropriate hard copy (or print) or cannot display a desired image. For example, even when a printer produces a printout of an image represented by image data received, the obtained image is not appropriate depending on characteristics of the printer.

In such an occasion, the user on the receiver side must convert the image data to obtain an appropriate hard copy (or print) of the image. This is troublesome when the user is unfamiliar with image processing.

SUMMARY OF THE INVENTION

It is therefore an object of the invention to transmit image data in a relatively short period of time.

Another object of the invention is to transmit data representing an image suitable for a device on the receiver side.

To achieve the objects above, there is provided an image communication system according to a first aspect of the present invention in which an image processing apparatus (e.g., a digital still camera) and a first portable (cellular) phone can communicate data with each other and the first portable phone can communicate a call with a second portable phone (a telephone, a data receiver or the like) via a telephone line. In this system, the first portable phone sends an image data reduction instruction to the image processing apparatus.

The image processing apparatus includes an instruction receiving device (means) for receiving the image data reduction instruction sent from the first portable phone, a data quantity reducing device (means) for reducing a data quantity of image data according to the image data reduction instruction received by the instruction receiving device, and a first image data transmitting device (means) for transmitting, to the first portable phone, the image data of which the data quantity is reduced by the data quantity reducing device.

The first portable phone includes an image data receiving device (means) for receiving the image data sent from the first image data transmitting device of the image processing apparatus and a second image data transmitting device (means) for transmitting via the telephone line the image data received by the image data receiving device to, for example, the second portable phone, server, printer, or the other image processing device.

The present invention also provides an image processing apparatus constituting the image communication system.

The present invention further provides an image processing method suitable for the image processing apparatus. There is provided an image processing method for use with an image processing apparatus constituting an image communication system in which the image processing apparatus can communicate data with a portable phone. The method comprises the steps of receiving an image data reduction instruction sent from the portable phone, reducing a data quantity of image data according to the image data reduction instruction received, and transmitting, to the portable phone, the image data of which the data quantity is reduced.

According to the present invention, the first portable phone sends an image data reduction instruction to the image processing apparatus.

The image processing apparatus receives the image data reduction instruction sent from the first portable phone. When the instruction is received, the quantity of image data is reduced by executing data reduction processing, for example, by re-sizing of an image represented by the image data, by compressing the image data, and/or by executing bit thinning-out processing to delete low-order bits of the image data. The image processing apparatus sends the image data of which the data quantity is reduced to the first portable phone.

Having received the image data with the reduced data quantity, the first portable phone sends the image data via the telephone line to, for example, a server.

Since the quantity of image data to be sent via the telephone line has been reduced, the data can be transmitted in a shorter period of time when compared with the original image data before the data quantity reduction. The transmission time is shortened. Consequently, even when the user is charged for the line according to time in which the line is used, the telephone charge can be kept at a low level.

The image processing apparatus may further include an input device (means) for inputting an image data reduction instruction. In this situation, the data quantity reducing device of the image processing apparatus will conduct image data reduction processing according to at least either one of an image data reduction instruction inputted from the input device and an image data reduction instruction received by the instruction receiving device.

The image data reduction instruction can be inputted from the image processing apparatus and from the first portable phone.

The image processing apparatus may further include a device (means) for setting a transmission mode of image data. The image data transmitting device of the image processing apparatus will transmit image data to the first portable phone when the transmission mode is set and will execute the image data quantity reduction, when the transmission mode is set, according to an image data reduction instruction received by the instruction receiving device.

The first portable phone may further include a reduction ratio receiving device (means) for receiving data representing a reduction ratio sent from the second portable phone via the telephone line and a reduction ratio transmitting device (means) for transmitting, to the image processing apparatus, the reduction ratio data receive by the reduction ratio receiving device.

The image processing apparatus further includes a reduction ratio data receiving device (means) for receiving the reduction ratio data transmitted from the reduction ratio transmitting device of the first portable phone. In this configuration, the data quantity reducing device will reduce image data according to a reduction ratio associated with the reduction ratio data received by the reduction ratio data receiving device.

The user of the second portable phone can set the image data reduction ratio. It is possible to receive image data having a data quantity desired by the user of the second portable phone.

At least one of the first portable phone and the image processing apparatus may include a detecting device (means) for detecting a data communication speed on the telephone line. It is desirable that the data quantity reducing device of the image processing apparatus increases a quantity of data reduction when a slower communication speed is detected by the detecting means.

The slower the communication speed on the telephone line is, the longer the transmission time of the image data is. Since the quantity of data to be reduced is increased (the remaining image data quantity is reduced) when the communication speed on the telephone line becomes slower, the transmission time can be minimized even if the communication speed is slow on the telephone line.

The first portable phone may include a mode notifying device (means) for notifying modes available in the first portable phone, the modes including an image data transmission mode. In this case, the first portable phone will transmit, when an image data transmission mode is selected from the modes notified by the mode notifying device, the image data reduction instruction to the image processing apparatus.

The image processing apparatus is, for example, an image data recording device for compressing image data received and for recording the image data compressed on a recording medium.

In this case, the image data quantity reducing device will reduce the data quantity of image data by compressing the image data according to a compression ratio higher than a compression ratio used to compress data in the recording of the data on the recording medium.

Before transmission of the image data, the image data is compressed according to a compression ratio higher than a compression ratio used to compress data in the recording of the data on the recording medium. The image data can be therefore transmitted in a shorter period of time.

When the image processing apparatus is a device to record image data, the image data quantity reducing device may compress data in a method different from a data compression method employed in the recording of the data on the recording medium.

For example, a special compression method of a higher compression ratio can be used to record the image data on the recording medium and a standard compression method can be used to transmit the image data.

When the image data of which the data quantity is to be reduced is associated with thumb-nail data, the first image transmitting device of the image processing apparatus may transmit the thumb-nail image data when the data quantity of the image data after the reduction of image data by the data quantity reducing device is in the vicinity of a data quantity of the thumb-nail image data (when an image represented by the image data after the reduction of data has a size in the vicinity of a size of the thumb-nail image). The data quantity reduction processing can be dispensed with in this situation.

The first portable phone may further include a device (means) for transmitting a transmission instruction of image data for printout to the image processing apparatus.

The image processing apparatus includes a device (means) for receiving the print image data transmission instruction transmitted from the first portable phone and a control device (means) for terminating the data quantity reduction processing by the image data quantity reducing device in response to reception of the print image data transmission instruction and for transmitting the image data before the data quantity reduction processing to the first portable phone.

To produce a high-quality copy or picture of an image, there is required image data of high resolution. When a transmission instruction of image data for printout is issued, image data before the data reduction is transmitted. The receiving system therefore can receive high-resolution image data. This results in high-quality printout.

The first portable phone may further include a print mode setting device (means) for setting a print mode in which a printer produces printout of an image.

In this configuration, the image processing apparatus further includes an image data converting device (means) for converting, when a print mode is set by the first portable phone, the image data to be transmitted into data suitable for an output format of the printer.

Since the image data to be transmitted is suitable for the output format of the image data, the image data receiving side need not convert the received image data into image data suitable for the output format (for example, processing to reduce colors suitable for the display, processing to convert the data into image data in an appropriate color space, and processing to convert the image data into an image format suitable for the printer need not be executed). It is possible to obtain in a relatively simple manner an image suitable for the system on the receiver side.

According to a second aspect of the present invention, there is provided an image communication system in which an image processing apparatus and a portable phone can communicate data with each other and the portable phone sets a print mode to produce printout of an image by a printer.

The image processing apparatus includes an image data converting device (means) for converting, when the print mode is set by the portable phone, image data into data suitable for an output format of the printer and a first transmitting device (means) for transmitting the image data converted by the image data converting device to the portable phone.

The portable phone includes a receiving device (means) for receiving the image data transmitted from the first transmitting device of the image processing apparatus and a second transmitting device (means) for transmitting via the telephone line the image data received by the receiving device.

The present invention also provides an image processing apparatus constituting the image data communication system.

The present invention also provides a method suitable for the image processing apparatus. That is, there is provided an image processing method for use with an image processing apparatus constituting an image communication system in which the image processing apparatus can communicate data with a portable phone. The method includes the steps of converting, when a print mode is set by the portable phone, image data into data suitable for an output format of a printer and of transmitting the image data converted to the portable phone.

According to the present invention, when a print mode is set in the portable phone, the image processing apparatus converts the image data into data suitable for the output format of the printer. The image data converted is sent from the image processing apparatus to the portable phone.

Having received the converted image data, the portable phone sends the image data via a telephone line to, for example, a server.

The receiving side of the image data can receive the image data suitable for the printer output format (with respect to the gradation, the color space, the image data format and the like). The received image data need only be supplied to the printer. Since the image data is suitable for the printer, there can be produced an appropriate printout.

BRIEF DESCRIPTION OF THE DRAWINGS

The objects and features of the present invention will become more apparent from the consideration of the following detailed description taken in conjunction with the accompanying drawings in which:

FIGS. 12 and 13 are diagrams showing a relationship between a communication speed and a re-size ratio;

DETAILED DESCRIPTION OF THE PREFERRED EMBODIMENTS

Figure 1:
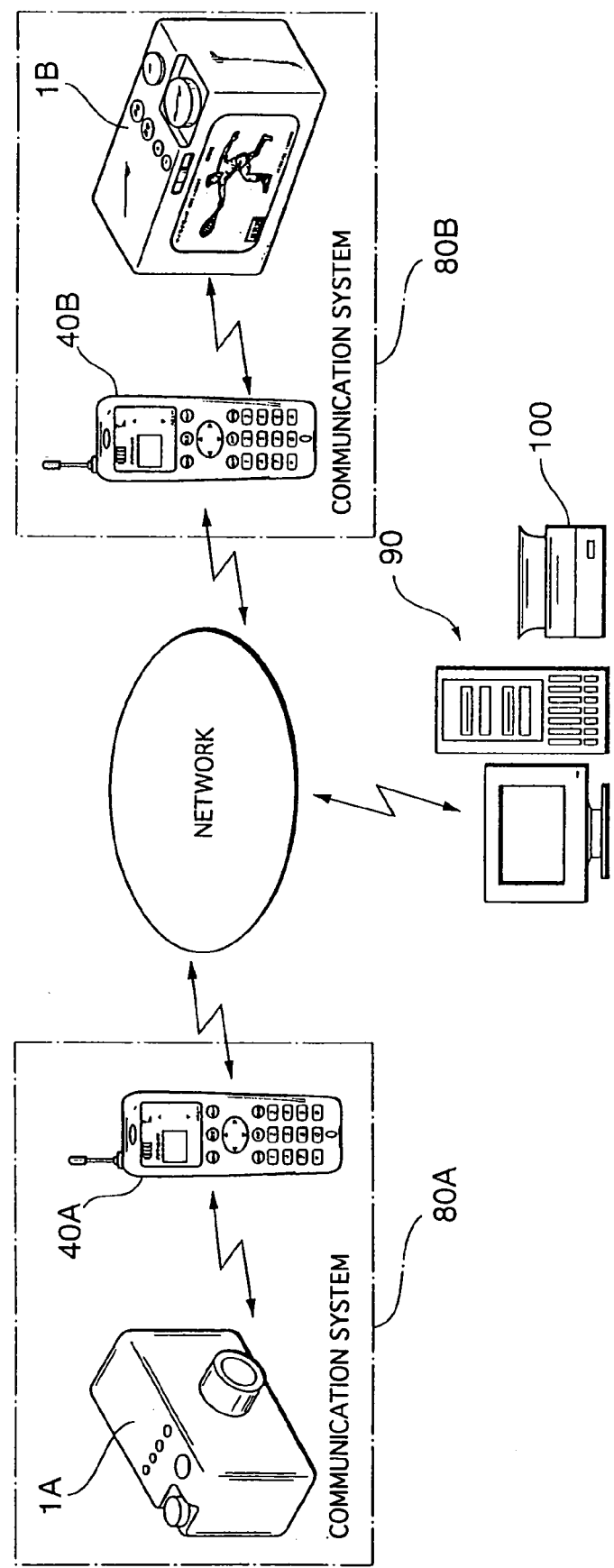
FIG. 1 is a diagram schematically showing an image communication system.

FIG. 1 schematically shows an embodiment of the present invention, namely, an outline of an image communication system.

This system includes communication systems 80A and 80B and a server 90 which can communicate data with each other. The systems 80A and 80B can send and receive image data. The server 90 has a printer 100 connected thereto.

In this embodiment, image data from the system 80A is once sent to the server 90 through a network. The image data is transmitted via the server 90 to the system 80B. Naturally, the data from the system 80A can be directly sent via the network to the system 80B without using the server 90.

In the embodiment above, although the image data is sent from the system 80A to the system 80B for convenience of explanation, it is to be understood that the image data may be sent from the system 80B to the system 80A. Both systems 80A and 80B can send and receive image data in this embodiment. However, it may also be possible that one of the systems is dedicated to transmission and the other one thereof to reception.

The communication system 80A includes a digital still camera 1A and a portable (cellular) phone 40A which can communicate data with each other. Although this embodiment uses radio waves to communicate data between the digital still camera 1A and the portable phone 40A, the data may be communicated via wire telecommunication. The communication system 80B similarly includes a digital still camera 1B and a portable (cellular) phone 40B. The digital still cameras 1A and 1B as well as the portable phones 40A and 40B are respectively of the same configurations.

Figure 2:
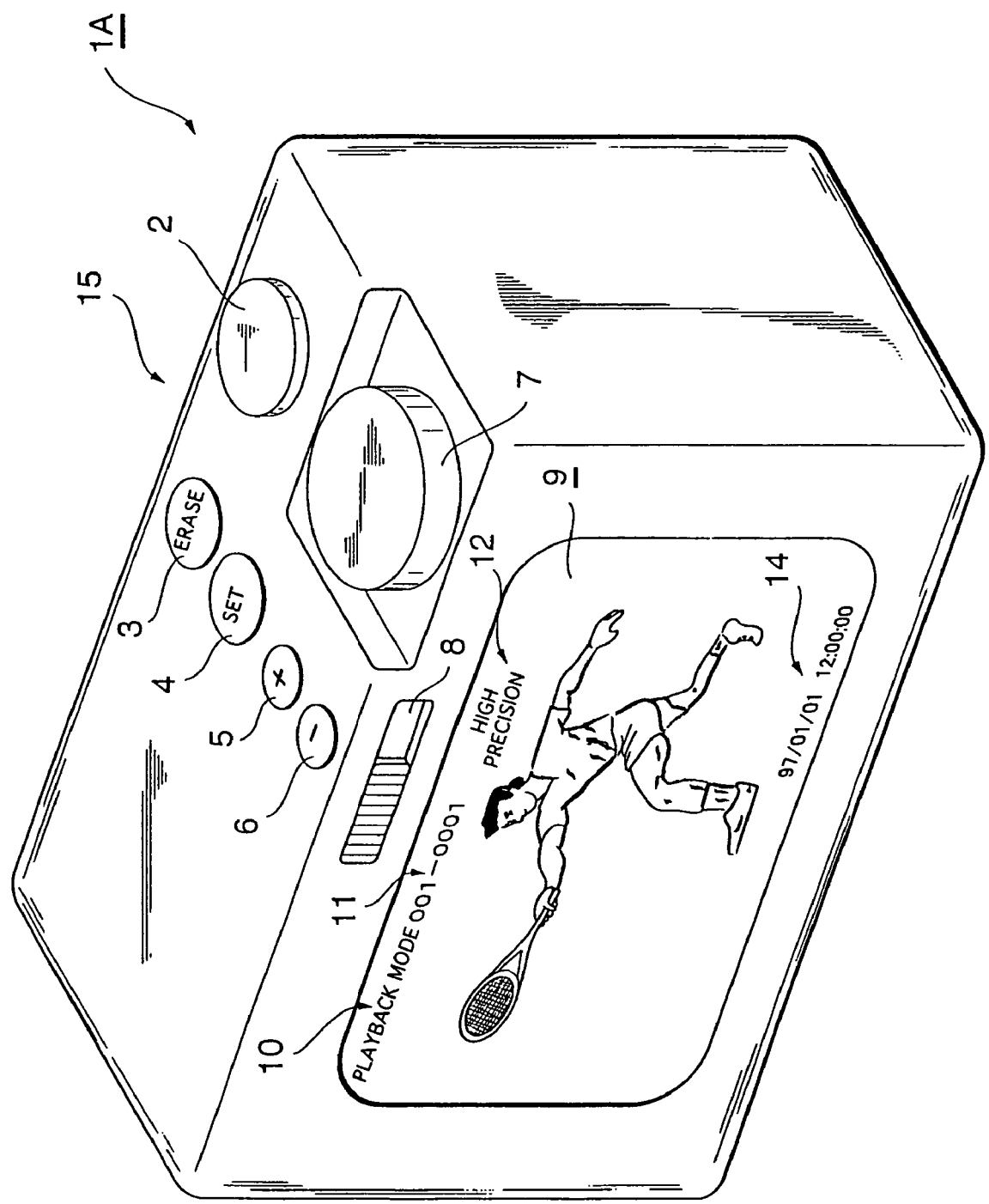
FIG. 2 is a perspective view of a rear side of a digital still camera.

FIG. 2 shows an appearance of a rear side of the digital still camera 1A.

The digital still camera 1A includes a group of switches 15 in a right-hand side of its upper surface. The switch group 15 includes a shutter release button 2, an erase or clear button 3 to issue an image erase or clear instruction, a setting button, an increment button 5, a decrement button 6, and a mode setting dial 7 (to set such modes as a setup mode, an image reproduction (playback) mode, a shooting mode and a communication mode).

The digital still camera 1A includes on its rear surface a display screen 9 of a liquid-crystal display device for displaying an image. The screen 9 almost fully occupies the rear surface. The display screen 9 includes an area 10 to display a mode currently selected, an area 11 to display a frame number of an image displayed, and an area 12 to indicate that the image being displayed on the screen 9 has been shot in a high-precision mode, a standard mode, or an economy mode in which image data is compressed with a higher compression ratio. The screen 9 further includes an area to display the current "day and time".

The rear surface of the digital still camera 1A further includes a power switch 8 in its upper section. The digital still camera 1A includes a radio wave antenna on a left-side surface thereof (opposite to a side surface on the right-hand side in FIG. 2) to communicate data with the portable phone 40A.

Figure 3:
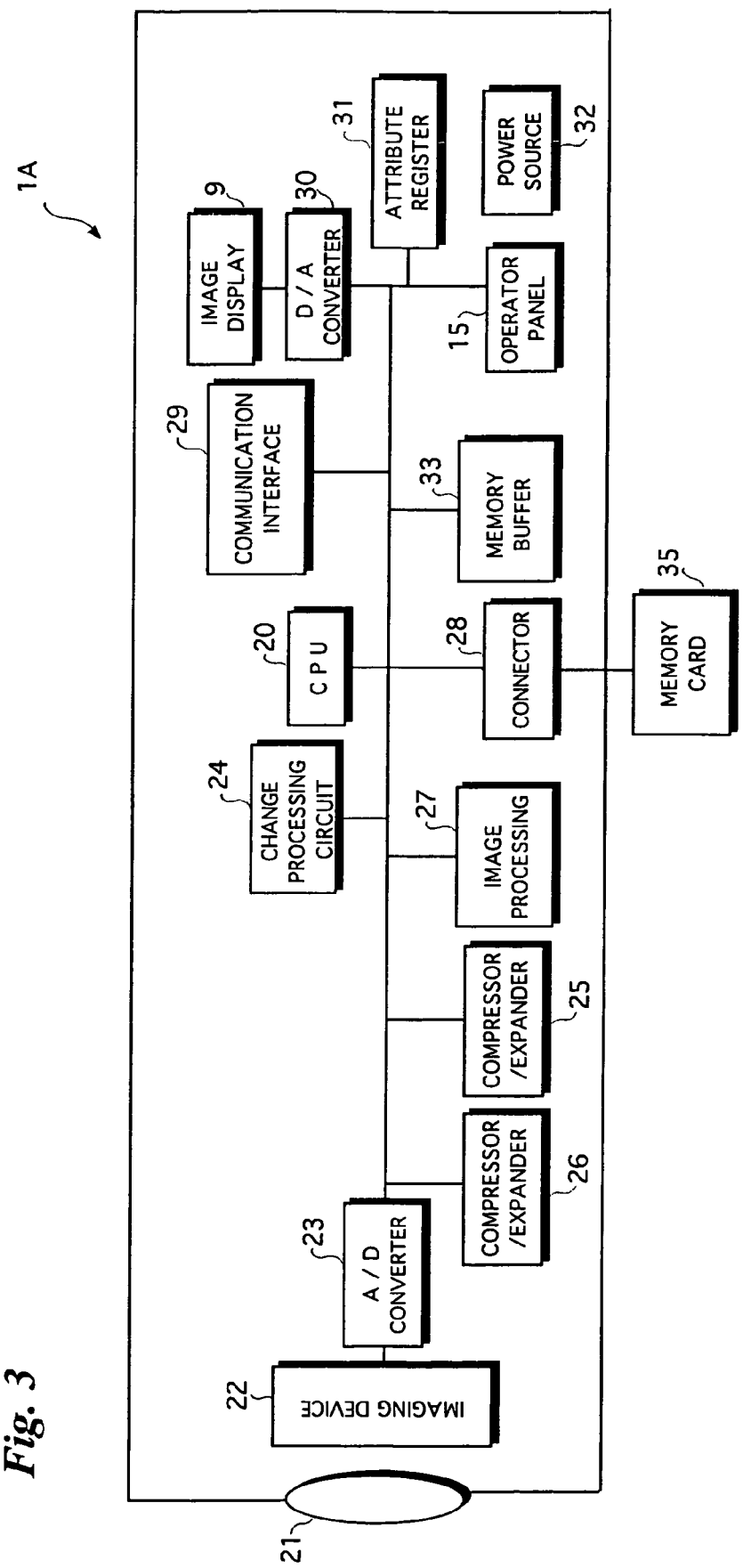
FIG. 3 is a block diagram showing an electric configuration of a digital still camera.

FIG. 3 shows in a block diagram an electric construction of the digital still camera 1A. The digital still camera 1A includes a central processing unit (CPU) 20, a shooting lens 21, a solid-state electronic imaging device 22, an analog-to-digital (A/D) converter 23, an image processing circuit 27, a digital-to-analog (D/A) converter 30, a display device 9, a memory buffer 33, a first compressor-expander (data compression/expansion circuit) 25, a second compressor-expander (data compression/expansion circuit) 26 and a change (modification) processing circuit 24.

The CPU 20 supervises overall operation of the digital still camera 1A.

Signals produced when the respective switches included in the group 15 are depressed are fed to the CPU 20.

The digital still camera 1A includes a connector 28. On the connector 28, a memory card 35 is detachably mounted.

The digital still camera 1A includes a communication interface 29 to communicate data with the portable phone 40A. The communication interface 29 includes a radio wave antenna, not shown, to communicate data with the portable phone 40A.

When the mode setting dial 7 sets a shooting (recording) mode, the shooting lens 21 produces an optically focused image of an object onto a light receiving surface of the imaging device 22. The imaging device 22 outputs a video signal representing the image to an A/D converter 23. The A/D converter 23 converts an analog video signal into digital image data.

The digital image data is fed to the image processing circuit 27. The image processing circuit 27 conducts predetermined signal processing such as white-balance adjustment and gamma correction for the data received. Image data from the processing circuit 27 is inputted to the D/A converter 30 and is again converted into an analog video signal. The signal is supplied to the display device 9 (this reference numeral 9 is used for the display and the display screen). The display device 9 resultantly displays an image of the object.

When the shutter release button 2 is depressed, the image data of the object is temporarily stored in the memory buffer 33. The data is thereafter read from the buffer 33 to be fed to the image processing circuit 27. The image data is compressed in the processing circuit 27. The compressed image data is delivered via the connector 28 to the memory card 35 and is recorded on the memory card 35.

When the dial 7 sets the reproduction (playback) mode, the image data is read from the memory card 35 and is fed to the first compressor-expander 25. The image data is expanded by the circuit 25 and is inputted to the D/A converter 30 to be converted into analog video signal. The signal is delivered to the display device 9 and is displayed as a reproduced image on the display screen.

When the dial 7 sets the communication mode in an image transmission phase, the image data is read from the memory card 35 and is expanded in almost the same way as for the reproduction mode. The image data expanded is inputted to the change (modification) processing circuit 24. The circuit 24 re-sizes the data (reduces the image size, for example, by thinning out image elements and compressing resultant image data) to reduce a quantity of image data to be transmitted. The image data re-sized is supplied to the communication interface 29. The data is therefore transmitted from the digital still camera 1A via the interface 29 to the portable phone 40A.

In an image data receiving phase, the image data transmitted from the portable phone 40A is received by the interface 29, and received image data is fed via the connector 28 to the memory card 35 to be recorded thereon.

The first compressor-expander 25 has a variable compression ratio which can be changed by setting a parameter. The second compressor-expander 26 compresses data in a compression procedure other than that of the first compressor-expander 25.

The digital still camera 1A also includes an attribute register 31 and a power supply circuit 32. The register 31 stores information of attributes such as a camera type or model code and a maker name. The power supply 32 powers respective constituent circuits of the digital still camera 1A.

Figure 4:
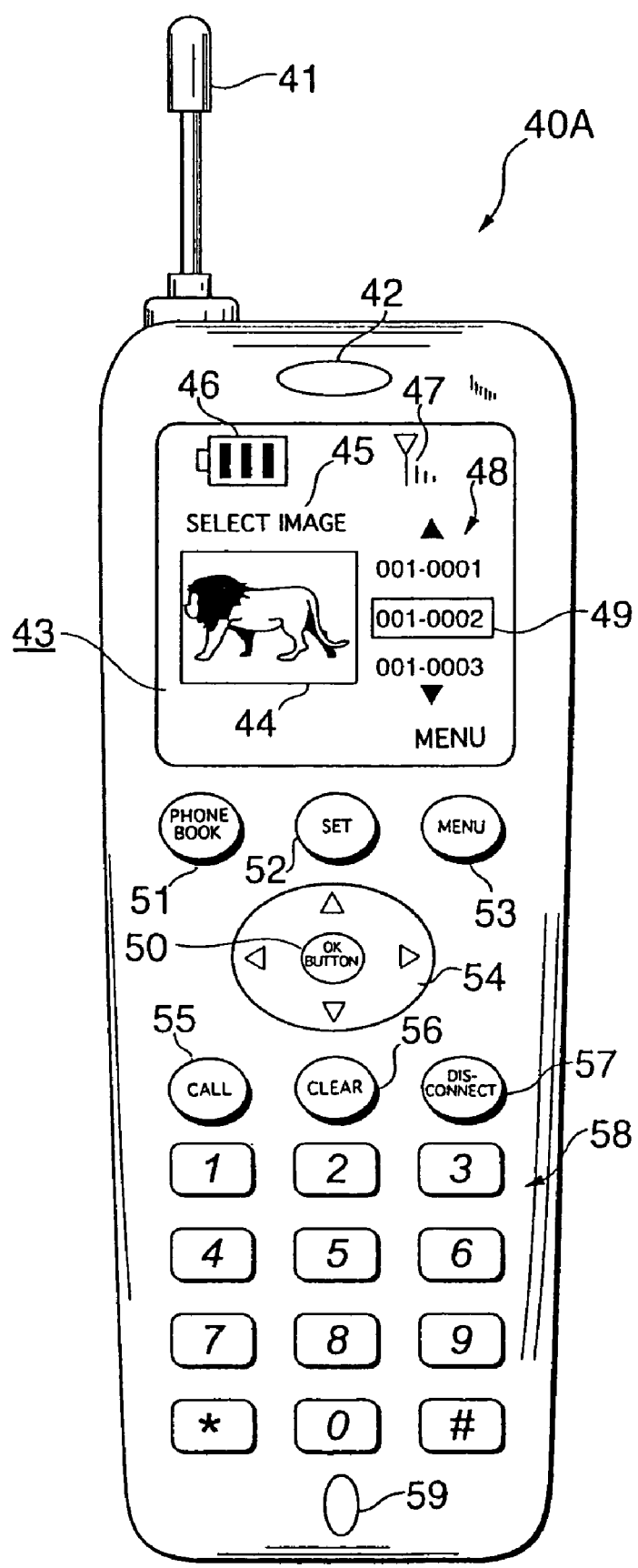
FIG. 4 is a top view showing an appearance of a portable phone.

FIG. 4 shows an appearance of a front side of the portable phone 40A.

The portable phone 40A includes in its upper end section an antenna 41 to communicate data with the digital still camera 1A and to communicate data (to conducts a call) via a network with the portable phone 40B and the server 100.

The portable phone 40A includes in an upper section of its front surface a speaker 42 to produce sound and voice.

The portable phone 40A includes a liquid-crystal display screen 43 below the speaker 42. The display screen 43 includes an area 46 to indicate power remained in a battery of the portable phone 40A, an area 47 to indicate degree of reception of radio waves by the portable phone 40A, and an area 45 to indicate a menu (mode) currently set. The screen 43 further includes an area 44 to display a thumb-nail image, a selection area 48 to display a selectable frame number of image and a selectable menu and so on. A cursor (frame) 49 to indicate, for example, a frame number to be selected also appears on the screen 43.

Below the screen 43, there are also provided a phone book button 51 which is depressed by the user to display in the screen 43 a list of phone numbers stored (a telephone directory), a setting button 52 which is depressed by the user to issue a setting instruction, and a menu button 53 for the user to display a menu on the screen 43.

There is further included an up/down and right/left button 54 below the buttons 51 to 53. The button 54 includes thereon an up arrow mark, a down arrow mark, a left arrow mark, and a right arrow mark. The user can depress each arrow mark. In response to depression of one of the arrow marks, the system produces a signal representing the depression of the arrow mark. The user can also depress a central section 50 of the button 54. When the center 50 is depressed, an instruction indicating "determination of operation" is issued (this is therefore called "OK button")

Below the button 54, there are disposed a call initiation button 55, a clear button 56, and a disconnect button 57. The portable phone 40A further includes a ten-key unit 58 below these buttons 55 to 57.

The front surface of the portable phone 40A includes in its lowermost section a microphone 59 to receive sound and voice.

Figure 5:
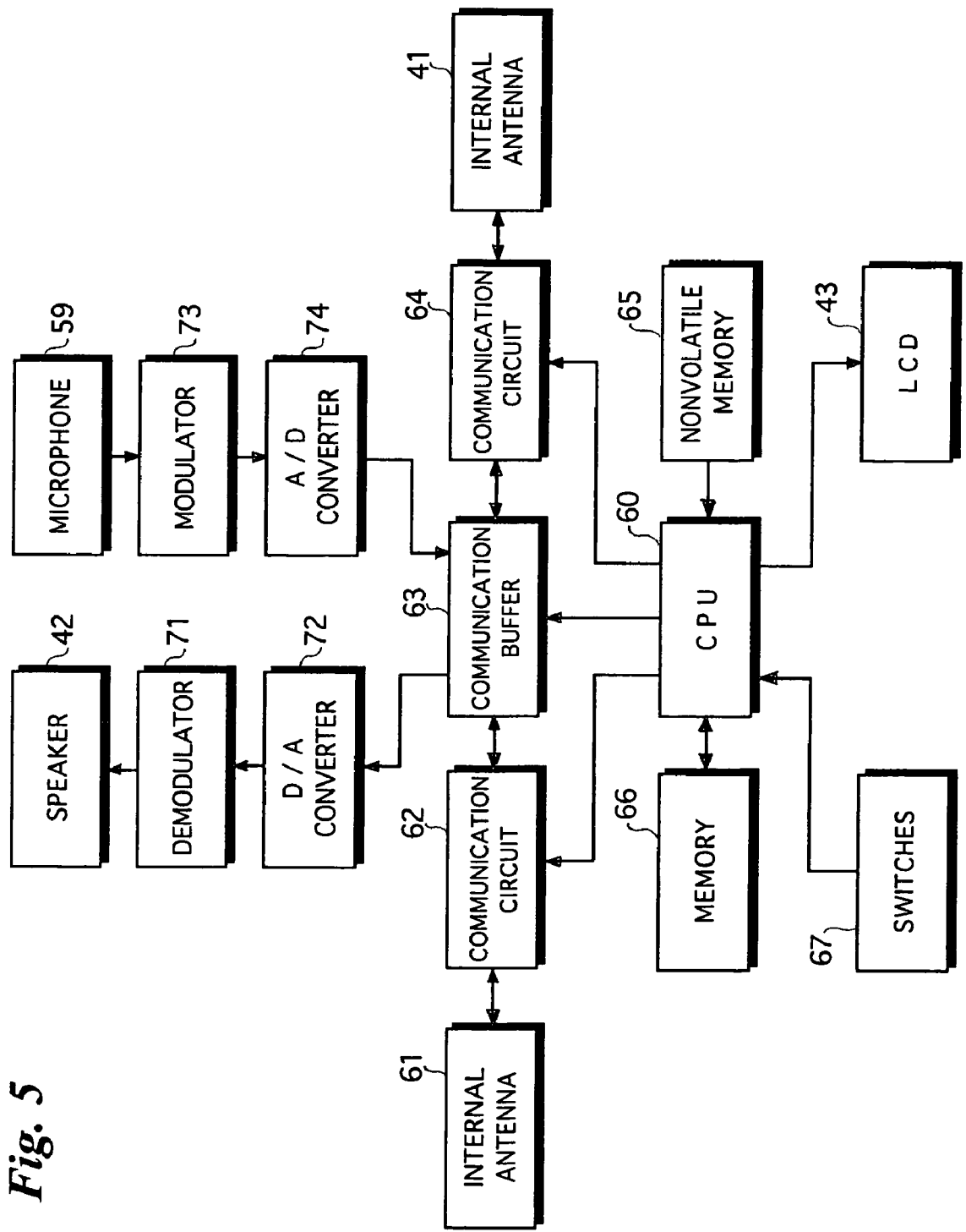
FIG. 5 is a block diagram showing an electric configuration of a portable phone.

FIG. 5 shows in a block diagram an electric configuration of the portable phone 40A.

The portable phone 40A includes a CPU 60, a group of switches 67, a modulator 73, an A/D converter 74, a communication buffer 63, a communication circuit 64, a D/A converter circuit 72, a demodulator circuit 71, an internal antenna 41, and a communication circuit 62.

The CPU 60 controls entire operation of the portable phone 40A.

The CPU 60 is connected to a nonvolatile memory 65 to store telephone numbers, electronic mail addresses, and uniform resource locators (URL).

The CPU 60 is connected to an external memory 66 to temporarily store various data.

Signals indicating depression of the respective switches described above (of the switch group 67) are supplied to the CPU 60.

Sound received by the microphone 59 is fed as an analog signal to the modulator 73 and modulated therein. The signal modulated is fed to the A/D converter 74 to be converted by the A/D converter 74 into digital sound or audio data.

The audio data is transmitted via the communication buffer 63, the communication circuit 64, and the internal antenna 41 to a communicating partner telephone.

The audio or voice data sent from the partner is received via the antenna 41 by the communication circuit 64. The voice data is delivered via the buffer 63 to the D/A converter 72 to be converted into an analog audio or voice signal. The signal is then demodulated by the demodulator 71 to be fed to the speaker 42. The speaker 42 resultantly produces sound.

When the image transmission mode is set, image data transmitted from the digital still camera 1A is received by the antenna 61 and is demodulated by the communication circuit

62. Resultant image data is sent from the communication circuit 62 to be temporarily stored in the buffer 63.

The image data is fed from the buffer 63 to the communication circuit 64. In the communication circuit 64, a 1.5 gigaherz (GHz) carrier wave is modulated according to the image data. Image data modulated is delivered to the antenna 41. The data is sent therefrom via a network to the server 90 or the portable phone 40B.

When the image reception mode is set, image data received via a network by the antenna 41 is demodulated by the communication circuit 64. The image data is sent from the circuit 64 to be temporarily stored in the buffer 63.

The image data is then fed from the buffer 63 to the communication circuit 62. The communication circuit 62 has a carrier wave of 2.4 GHz which is different from the carrier wave of the communication circuit 64. The 2.4 GHz carrier wave is modulated according to the image data. The image data modulated is fed to the antenna 61 to be transmitted therefrom to the digital still camera 1A.

FIGS. 6 to 9 show examples of the display screen 43 of the portable phone 40B.

Figure 6:
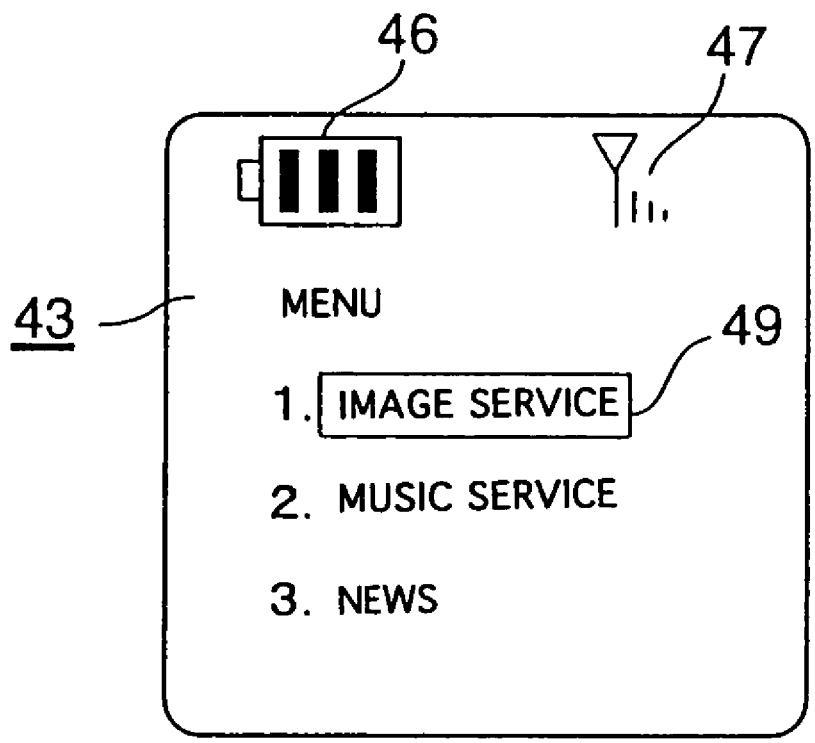
FIGS. 6 to 8 are diagrams showing examples of a display screen of a portable phone.

FIG. 6 shows an example of a menu image.

When the user depresses the menu switch 53 of the portable phone 40A, the menu image of FIG. 6 appears on the screen 43.

In the portable phone 40A of this embodiment, the user can selects one of the services shown on the screen 43, i.e., 1. Image service; 2. Music service; and 3. News.

The cursor 49 is displayed on the screen 43. When the up arrow mark is depressed in the button 54, the cursor moves upward. When the down mark is depressed, the cursor moves downward. When the user of the portable phone 40A depresses the OK button 50 while "image service" is being enclosed by the cursor 49, the screen 43 changes to an image service menu shown in FIG. 7.

Figure 7:
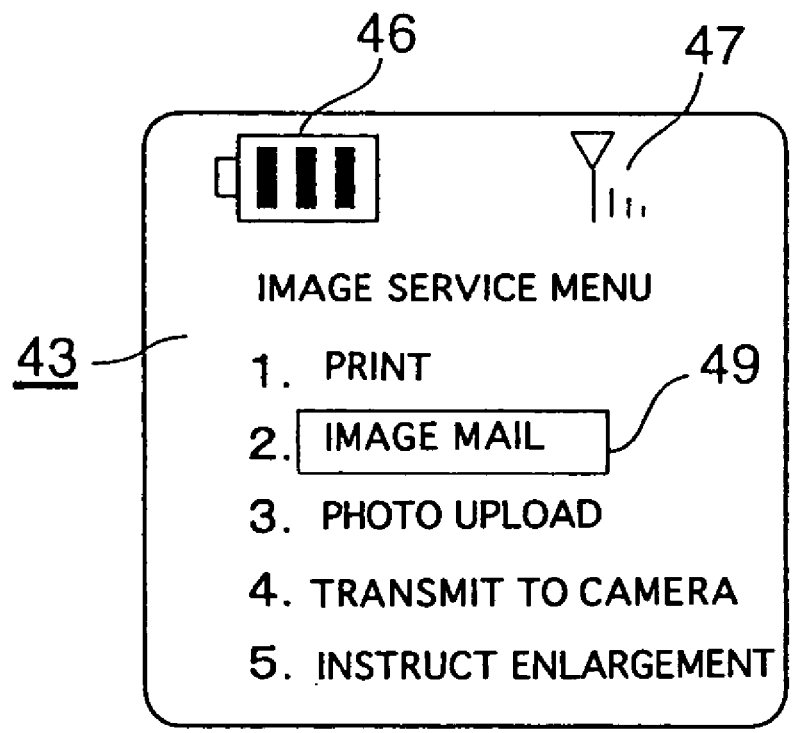

The image service menu on the screen 43 of FIG. 7 includes 1. Print; 2. Image mail; 3. Photo upload; 4. Transmit data to camera; and 5. Instruct enlargement. "1. Print" indicates a service which is selected by the user to print an image by a printer 100 connected to a server 90. "2. Image mail" is a service for the user to send image data to the communication system 80B. "3. Photo upload" is a service which is selected by the user to upload image data onto the server 90. "4. Transmit data to camera" is a service for the user to send received image data to a digital still camera. "5. Instruct enlargement" is a service for the user to request a high-quality image.

Figure 8:
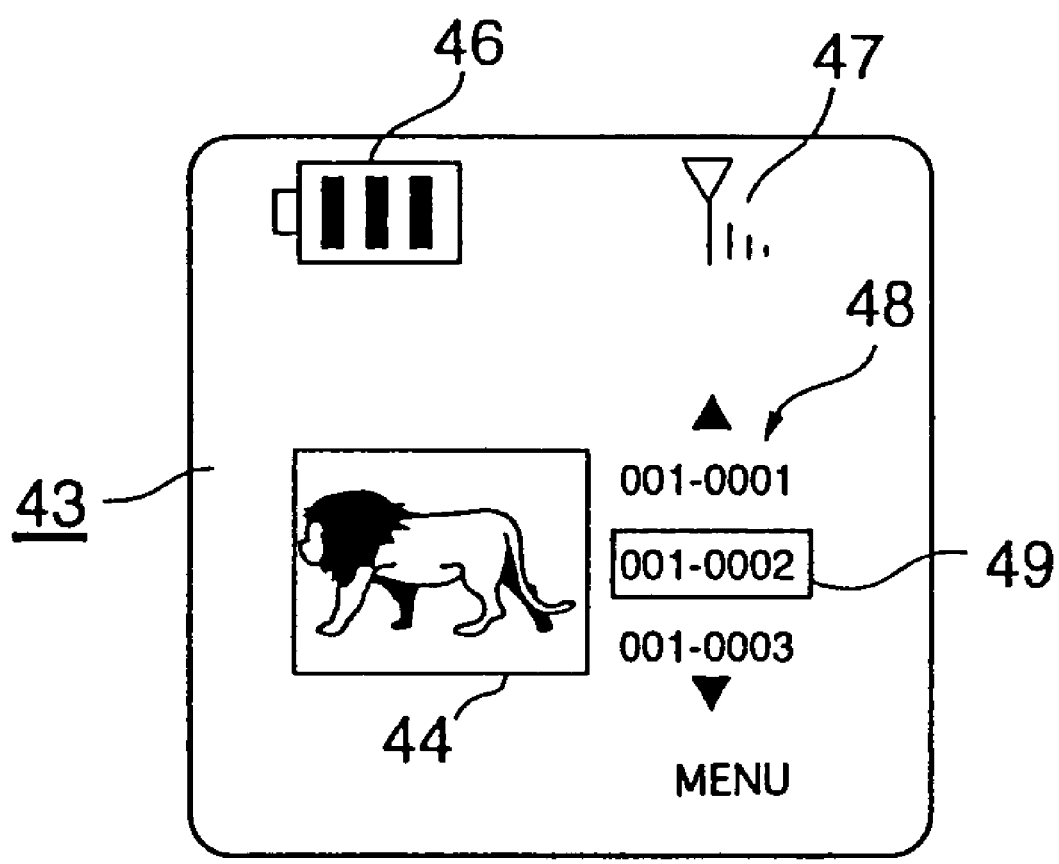

When the user of the portable phone 40A depresses the OK button 50 while "image mail" is being enclosed by the cursor 49, the screen 43 changes to an image selection menu shown in FIG. 8.

The image of the selection menu includes an area 48 to display a frame number of selectable image and an area 44 to display a thumb-nail image of an image identified by a frame number enclosed by the cursor 49. When the OK button 50 is depressed, the image of a frame number enclosed by the cursor 49 is selected as a subject of transmission, that is, image data representing the image is to be transmitted. Selectable frame numbers are naturally beforehand sent from the digital still camera 1A to the portable phone 40A.

Figure 9:
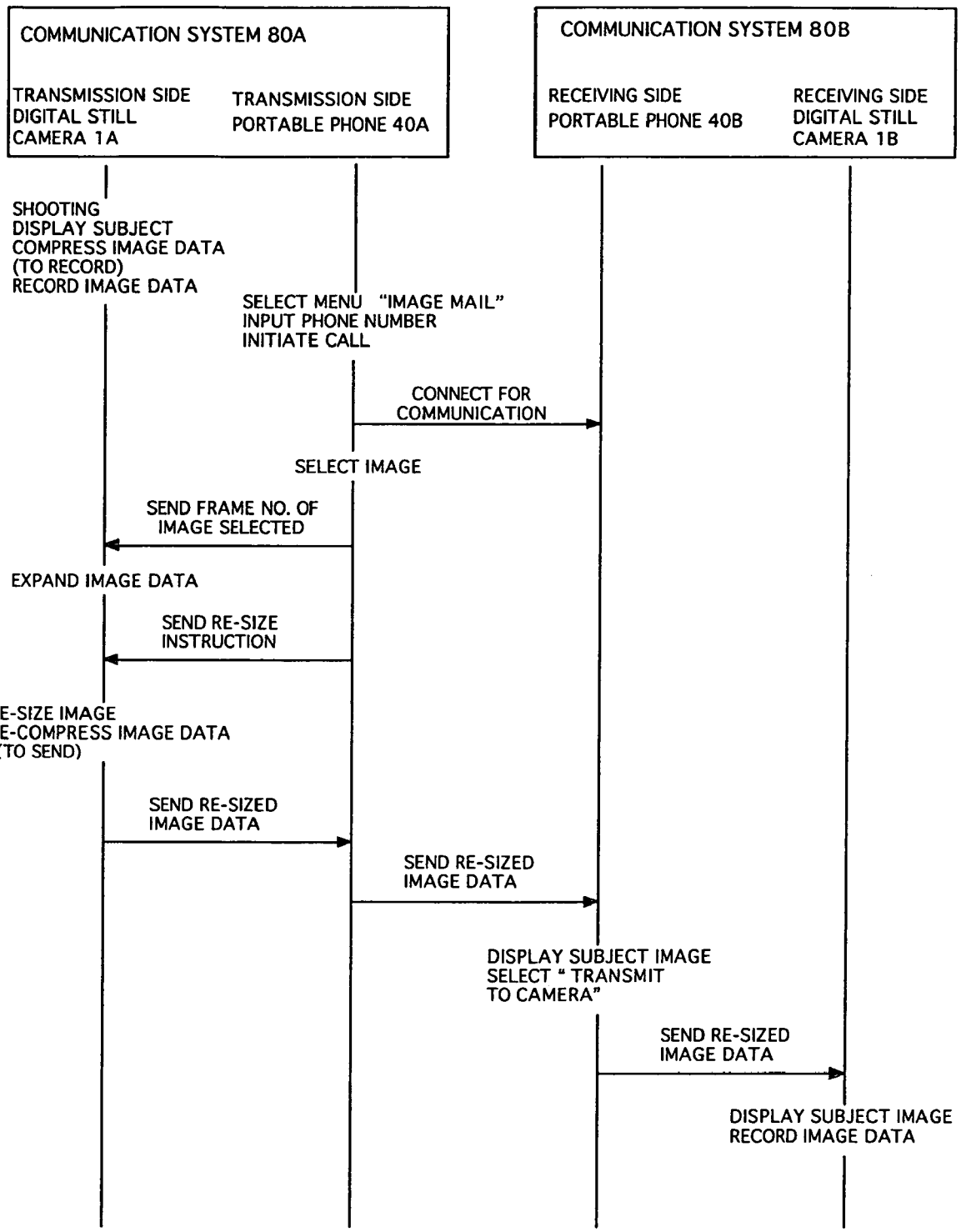
FIG. 9 is a flowchart showing a communication processing procedure of image data in one embodiment.

FIG. 9 shows in a flowchart a processing procedure of data communication between the communication systems 80A and 80B.

As above, a subject is shot by the digital still camera 1A and an image of the subject is presented on the display screen of the display device 9. Image data representing the image of the subject is compressed by the image processing circuit 27 and is recorded on the memory card 35.

The user of the portable phone 40A selects "2. Image mail" from the image service items and then inputs a phone number of the partner portable phone 40B to which image data is to be sent. When the user depresses the call button 55, the portable phone 40A is connected for communication with the portable phone 40B as the destination of the image data.

In the portable phone 40A on the transmission side, the image data to be transmitted is selected as above. Data designating a frame number of image selected by the user is sent from the portable phone 40A to the digital still camera 1A.

The digital still camera 1A receives the data of the frame number from the portable phone 40A. Image data corresponding to the frame number is read from the memory card 35 and is fed to the first compressor-expander 25. The circuit 25 expands the compressed image data. The resultant image data is temporarily stored in the memory buffer 33 of the digital still camera 1A.

The portable phone 40A detects occurrence of a re-size instruction. Data representing the re-size instruction is sent from the portable phone 40A to the digital still camera 1A.

When the digital still camera 1A receives the data of the re-size instruction, the data temporarily stored in the buffer 33 is read therefrom and is delivered to the change (modification) processing circuit 24. The circuit 24 re-sizes the image data to reduce the quantity thereof. Image data resultant from the re-sizing is fed to the first compressor-expander circuit 25. The circuit 25 changes a compression parameter to compress the image data with a compression ratio larger than that used when the image data is compressed and is recorded on the memory card 35.

The image data resized and compressed (resized image data) is sent from the digital still camera 1A via the interface 29 to the portable phone 40A.

When the portable phone 40A receives the resized image data from the digital still camera 1A, the data is then sent via a network to the portable phone 40B on the receiver side.

Having received the re-sized image data, the portable phone 40B temporarily stores the re-sized image data in the communication buffer 63. The re-sized image data is thereafter read from the communication buffer 63 to be fed to a display device of the portable phone 40B. The display device presents an image of the re-sized image data on its display screen. The user of the portable phone 40B confirms the re-sized image on the display screen and selects "4. Transmit data to camera" in the image service menu. The re-sized image data is then read from the communication buffer 63 to be sent to the digital still camera 1B on the receiver side (the digital still camera 1B is assigned with a particular identifier code and the image data is naturally sent to the digital still camera 1B using the identifier code).

When the re-sized image data is received by the digital still camera 1B, the re-sized image data is fed to the display device. An image represented by the re-sized image data is displayed on the display screen of the display device. The re-sized image data is recorded in a memory card of the digital still camera 1B.

When image data is sent from the communication system 80A to the communication system 80B, the image data is re-sized by the digital still camera 1A of the communication system 80A to minimize the quantity of image data to be transmitted. Consequently, the transmission time of the image data is reduced. Since the re-sized image data is compressed with a compression ratio larger than that used when the image data is compressed to be recorded on the memory card 35, the period of time required to send the image data is shortened.

Although the re-sizing and the re-compression processing of the image data are carried out by the digital still camera 1A on the sender side in this embodiment, it is only necessary to execute at least either one of the re-sizing and the re-compression processing.

In the embodiment, although the image data seems to be sent from the portable phone 40A on the sender side to the portable phone 40B on the receiver side without using the server 90, it is to be understood that the image data is transmitted from the portable phone 40A via the server 90 to the portable phone 40B. However, the image data may be actually sent from the portable phone 40A directly to the portable phone 40B without using the server 90.

Figure 10:
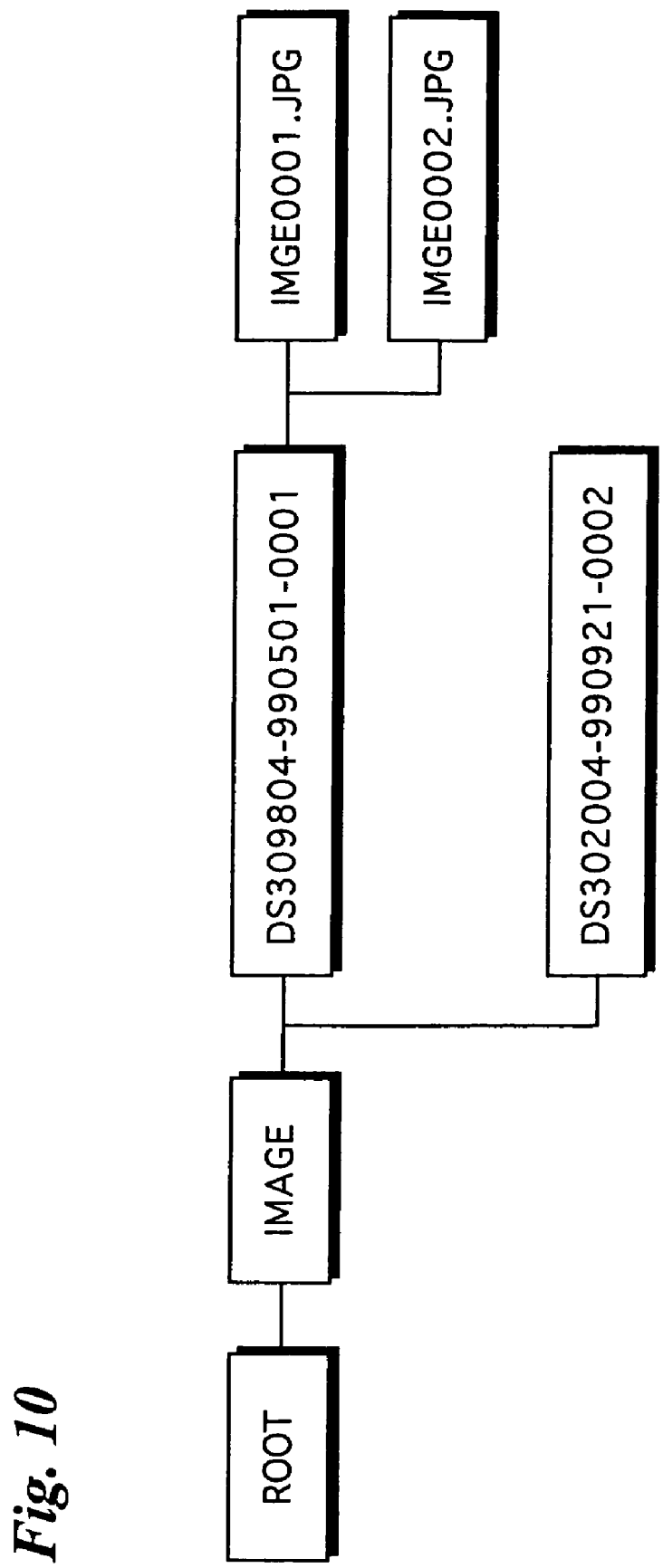
FIG. 10 is a diagram showing a directory layout on a memory card.

FIG. 10 shows a directory layout of the memory card of the digital still camera 1B on the receiving side.

The directory includes a root directory to manage all directories having a directory name "image". A directory having a directory name "image" manages image data transmitted (received). Image data items (image files) managed with a sub-directory name under the directory having a directory name "image" are image data items transmitted (received) through one transmission.

For example, image files (with file names "IMAGE0001.JPG", "IMAGE0002.JPG", and the like) managed under a sub-directory name "DS309804-990501-0001" are image files transmitted through one transmission. A sub-directory name comprises a type code (DS309804) of the digital still camera 1A on the sender side, a transmission date (990501), and a directory number (0001). Attribute information stored in the attribute register 31 of the digital still camera 1A is sent together with the image data. It is naturally possible that the type or model code is obtained from the attribute information and is used as an item of the sub-directory name.

A telephone number of the portable phone 40A having sent the image data may be employed as a sub-directory name. By checking the sub-directory name, it is possible to determine the telephone number of the portable phone 40A having sent the image data.

Figure 11:
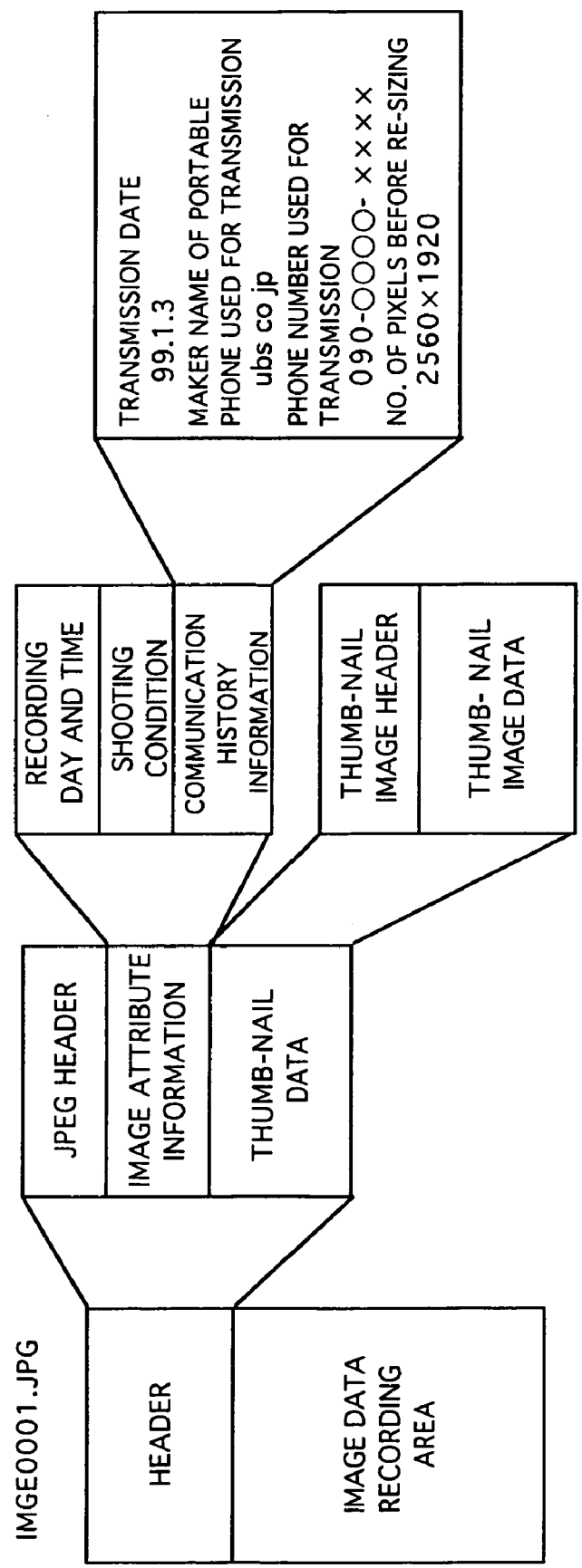
FIG. 11 is a diagram showing constitution of an image file.

FIG. 11 shows a file layout of an image file (IMGE0001.JPG) recorded on a memory card of the digital still camera 1B on the receiving side.

The image file includes a header and an image data recording area.

The re-sized image data as above is recorded on the image data recording area.

The header includes a header area to indicate a format of image data (a joint photographic coding experts group (JPEG) header area in this case), an image attribute information area, and thumb-nail data area.

The image attribute information area stores recording day and time, shooting conditions and communication history information. The communication history information includes a transmission date, a maker name of the portable phone having sent image data, a phone number of the portable phone having sent image data, and data indicating the number of pixels of image before the re-sizing. When the image data is sent from the communication system 80A to the communication system 80B, the communication history information is stored in the image file.

The thumb-nail data recording area includes a thumb-nail image header and thumb-nail image data.

Although the change processing circuit 24 re-sizes the data quantity of the image data for transmission in the embodiment, the image data quantity may be reduced by deleting low-order bits of the image data (by the so-called bit thinning-out). This processing will be executed by the circuit 24.

In the embodiment, the first compressor-expander circuit 25 compresses image data, which is recorded on the memory card 35. However, when recording the image data on the memory card 35, the second compressor-expander circuit 26 may compress the data. Even if the circuit 26 compresses the image data in a particular compression method, the circuit 25 compresses image data in a standard data compression method in an image data transmission phase. The receiver receives the image data compressed in such a standard method and hence can expand the image data received.

The digital still camera 1A may be further provided with a switch to issue a re-size instruction. An image can be therefore re-sized without the re-size instruction from the portable phone 40A. The re-sizing will be executed also by the change processing circuit 24 of the digital still camera 1A.

In the embodiment, an image represented by image data is re-sized regardless of the communication speed of the network and then the image data re-sized is transmitted. However, the re-sizing ratio may be changed according to the communication speed of the network.

FIGS. 12 and 13 show relationships between the communication speed and the re-sizing ratio for an image of 1280 horizontal pixels×960 vertical pixels and an image of 2560 horizontal pixels×1920 vertical pixels, respectively.

In both cases, the higher the communication speed is, the greater the re-sizing ratio is, that is, the data quantity reduced becomes smaller. This is because that the higher the transmission speed is, the shorter the period of time required to send image data is even if the image data has a large amount of data.

Figure 14:
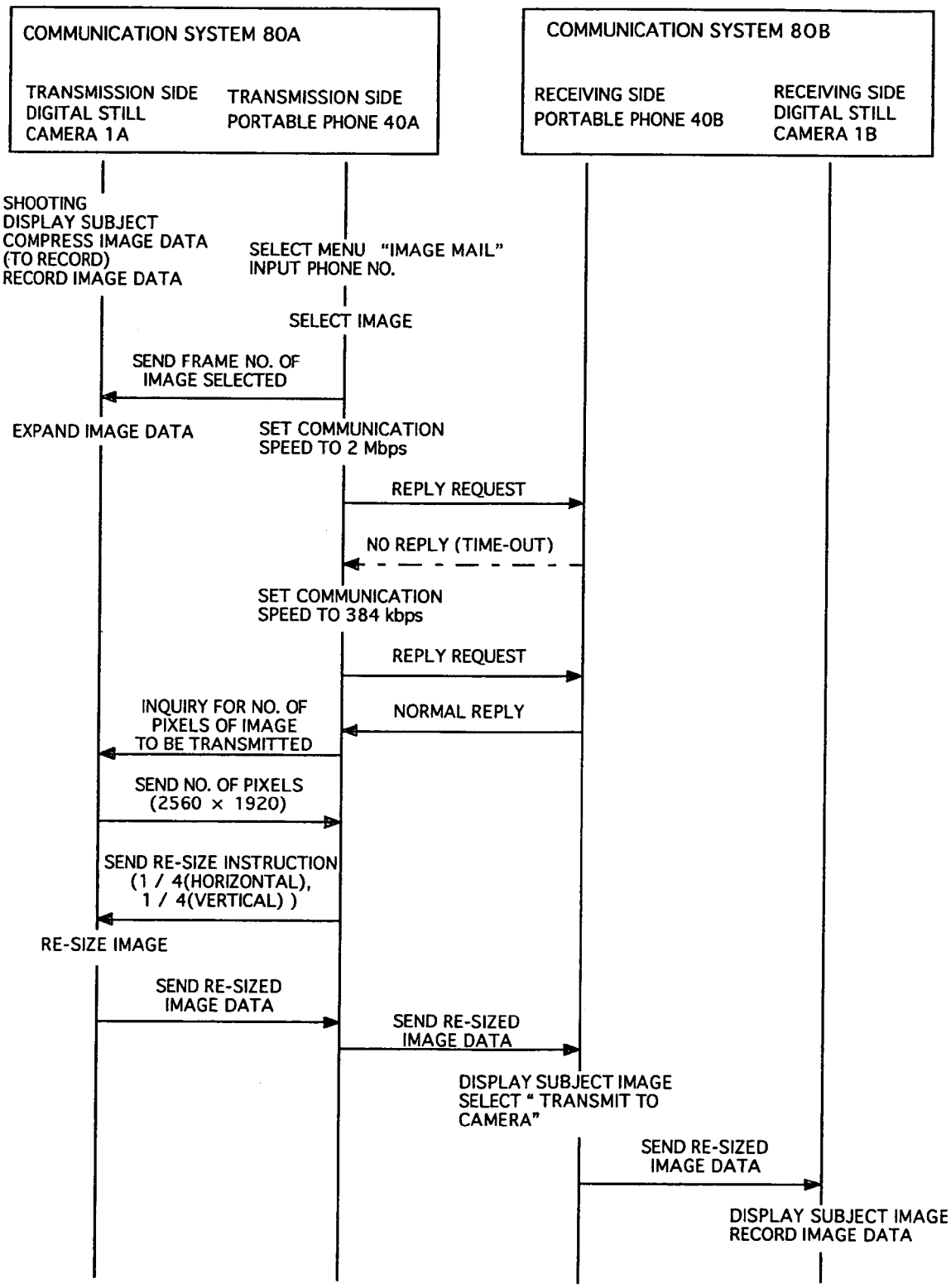
FIG. 14 is a flowchart showing a communication processing procedure of image data in another embodiment.

FIG. 14 shows in a flowchart a processing procedure to send image data from the communication system 80A to the communication system 80B.

The re-sizing ratio is changed according to the data communication speed of the network in this processing procedure.

As above, the phone number of the portable phone 40B of the receiving side is inputted in the portable phone 40A of the transmission side. The user of the portable phone 40A selects an image for transmission and then data indicating a frame number of the image selected is sent from the portable phone 40A to the digital still camera 1A. In the digital still camera 1A, the image data to be transmitted is expanded.

The portable phone 40A of the transmission side is set to a highest communication speed, e.g. 2 Mbps and a reply request is sent from the portable phone 40A of the transmission side to the portable phone 40B of the receiving side.

If it is possible for the portable phone 40B to receive image data at a communication speed indicated by the replay request from the portable phone 40A of the transmission side, the portable phone 40B of the receiving side sends a normal replay to the portable phone 40A. If the reception is not possible, no reply is sent from the portable phone 40B of the receiving side to the portable phone 40A of the transmission side. When a predetermined period of time lapses without any replay, a time-out is assumed. The portable phone 40A of the transmission side recognizes that the image data cannot be sent at the communication speed requested.

The communication speed is stepwise reduced to 384 kbps in this situation. The portable phone 40A of the transmission side sends again a reply request to the phone 40B of the receiving side.

If the portable phone 40B can receive image data at the communication speed of the replay request from the portable phone 40A, the portable phone 40B of the receiving side transmits a normal replay to the portable phone 40A of the transmission side.

Having received the normal replay, the portable phone 40A selects the digital still camera 1A and inquires the digital still camera 1A of the number of pixels of an image for transmission.

In response thereto, the digital still camera 1A sends data of the number of pixels to the portable phone 40A. Assume that an image of 2560 horizontal pixels×1920 vertical pixels is selected.

Having received the data, the portable phone 40A sends a re-size instruction to the digital still camera 1A according to the communication speed at which image data can be received by the portable phone 40B of the receiving side. Since the communication speed is 384 kbps and the image selected includes 2560 horizontal pixels×1920 vertical pixels in this embodiment, the re-size instruction from the portable phone 40A to the digital still camera 1A is determined by referencing FIG. 13 to reduce the number of pixels to one fourth for each of the horizontal and vertical directions.

The digital still camera 1A accordingly re-sizes the image data and sends the image data re-sized to the portable phone 40A.

The portable phone 40A receives the re-sized image data and then transmits the re-sized image data to the portable phone 40B on the receiving side. Having received the re-sized data, the portable phone 40B sends the re-sized image data to the digital still camera 1B. The re-sized image data is then recorded on a memory card of the digital still camera 1B as described above.

Figure 15:
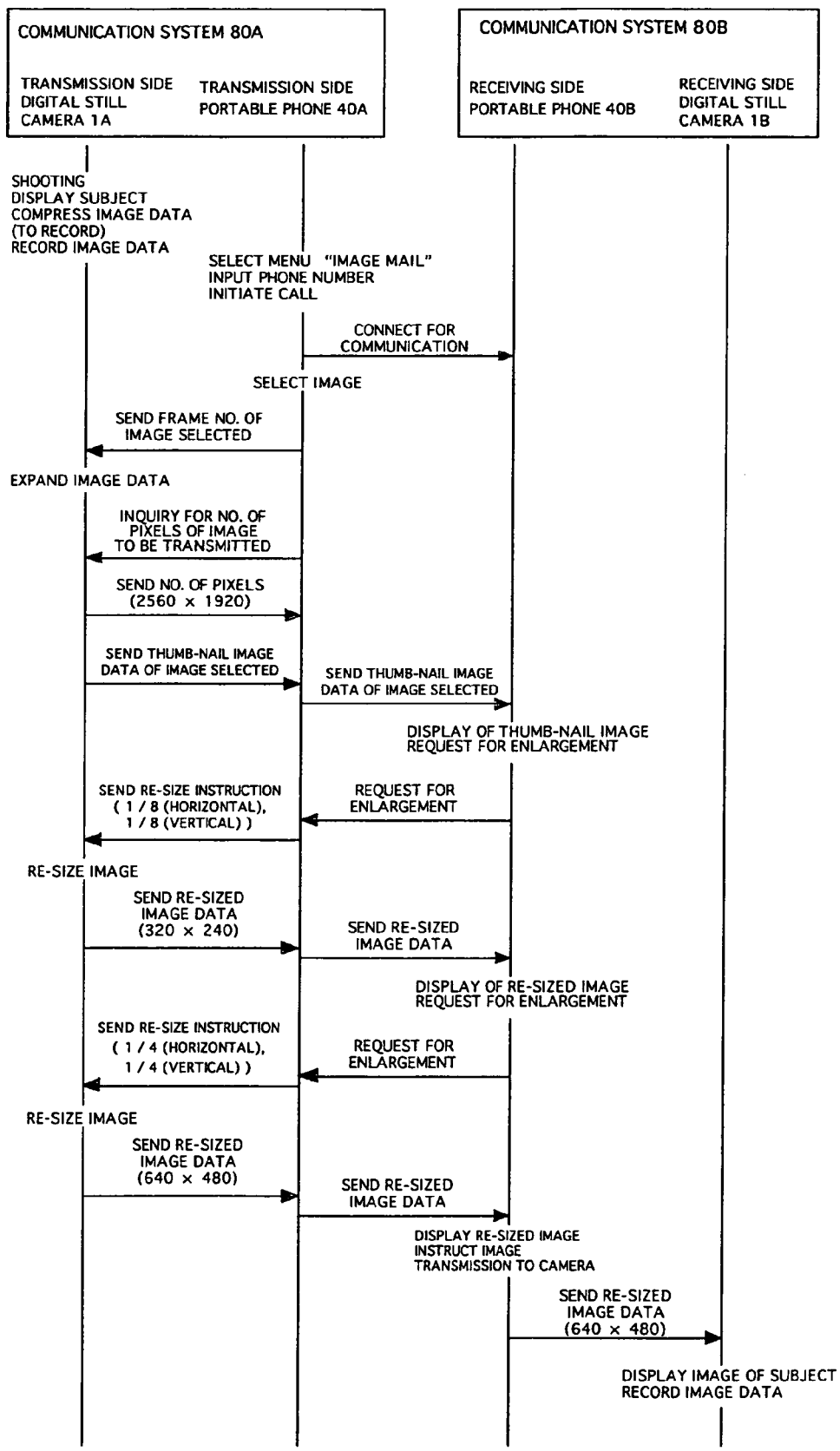
FIG. 15 is a flowchart showing a communication processing procedure of image data in a further embodiment.

FIG. 15 shows in a flowchart of another embodiment of a communication procedure between the communication systems 80A and 80B.

The re-sizing ratio is determined according to an instruction from the portable phone 40B on the receiving side in the processing procedure of FIG. 15.

As above, an image for transmission is selected and data of a frame number of the image selected is sent from the portable phone 40A to the digital still camera 1A on the transmission side. The portable phone 40A thereafter inquires the digital still camera 1A of the number of pixels of the image selected.

The digital still camera 1A sends data representing the number of pixels, for example, 2560 horizontal pixels×1920 vertical pixels, to the portable phone 40A. The digital still camera 1A transmits data of a thumb-nail image corresponding to the selected image to the portable phone 40A.

Having received the thumb-nail image data, the portable phone 40A on the transmission side sends the received thumb-nail image data to the portable phone 40B on the receiving side.

When the thumb-nail image data is received by the portable phone 40B of the receiving side, a thumb-nail image represented by the thumb-nail image data is displayed on the display screen of the portable phone 40B. The user visually checks the thumb-nail image on the screen to confirm the image presented by the image data transmitted. If it is desired that image data of an image having resolution higher than resolution of the thumb-nail image is recorded in the digital still camera 1B on the receiving side, a request for enlargement is inputted to the portable phone 40B ("Instruct enlargement" is selected as above; FIG. 7). The data of enlargement request inputted is transmitted from the portable phone 40B on the receiving side to the portable phone 40A on the transmission side.

Having received the enlargement request data, the portable phone 40A sends a re-size instruction, for example, ⅛ in both of horizontal and vertical directions, to the digital still camera 1A.

When the digital still camera 1A on the transmission side receives the re-size instruction, the image data of the selected image is re-sized according to the re-size instruction. The digital still camera 1A sends the image data resized (to 320 horizontal pixels×240 vertical pixels) to the portable phone 40A on the transmission side.

The portable phone 40A receives the re-sized image data and then sends the re-sized image data to the portable phone 40B of the receiving side.

When the portable phone 40B receives the re-sized image data, the re-sized image data is delivered to the display. The image is displayed with the new resolution. If the new image displayed is not satisfactory, the user of the portable phone 40B again inputs a request for enlargement.

The enlargement request is sent from the portable phone 40B to the portable phone 40A. In response thereto, the portable phone 40A sends again a re-size instruction to the digital still camera 1A on the transmission side. The re-size instruction improves the resolution. For example, a re-size instruction to reduce pixels to ¼ for the horizontal and vertical directions is sent to the digital still camera 1A.

The digital still camera 1A re-sizes the image data according to the re-size instruction. The re-sized image data is sent from the digital still camera 1A to the portable phone 40A.

The portable phone 40A transmits the re-sized image data to the portable phone 40B. The re-sized image data is transferred to the display of the portable phone 40B. The image is displayed on the display screen with higher picture quality.

Until the user satisfies with the displayed image, the request for enlargement is sent to the portable phone 40A to repeatedly execute the re-sizing.

When the user satisfies with the image, a transmission instruction is inputted to the portable phone 40B ("Transmit data to camera" is selected; FIG. 7). The portable phone 40B sends the re-sized image data to the digital still camera 1B. The re-sized image data is then recorded on a memory card of the digital still camera 1B.

The user on the image data receiving side can indicate the re-sizing ratio, namely, image quality.

Figure 16:
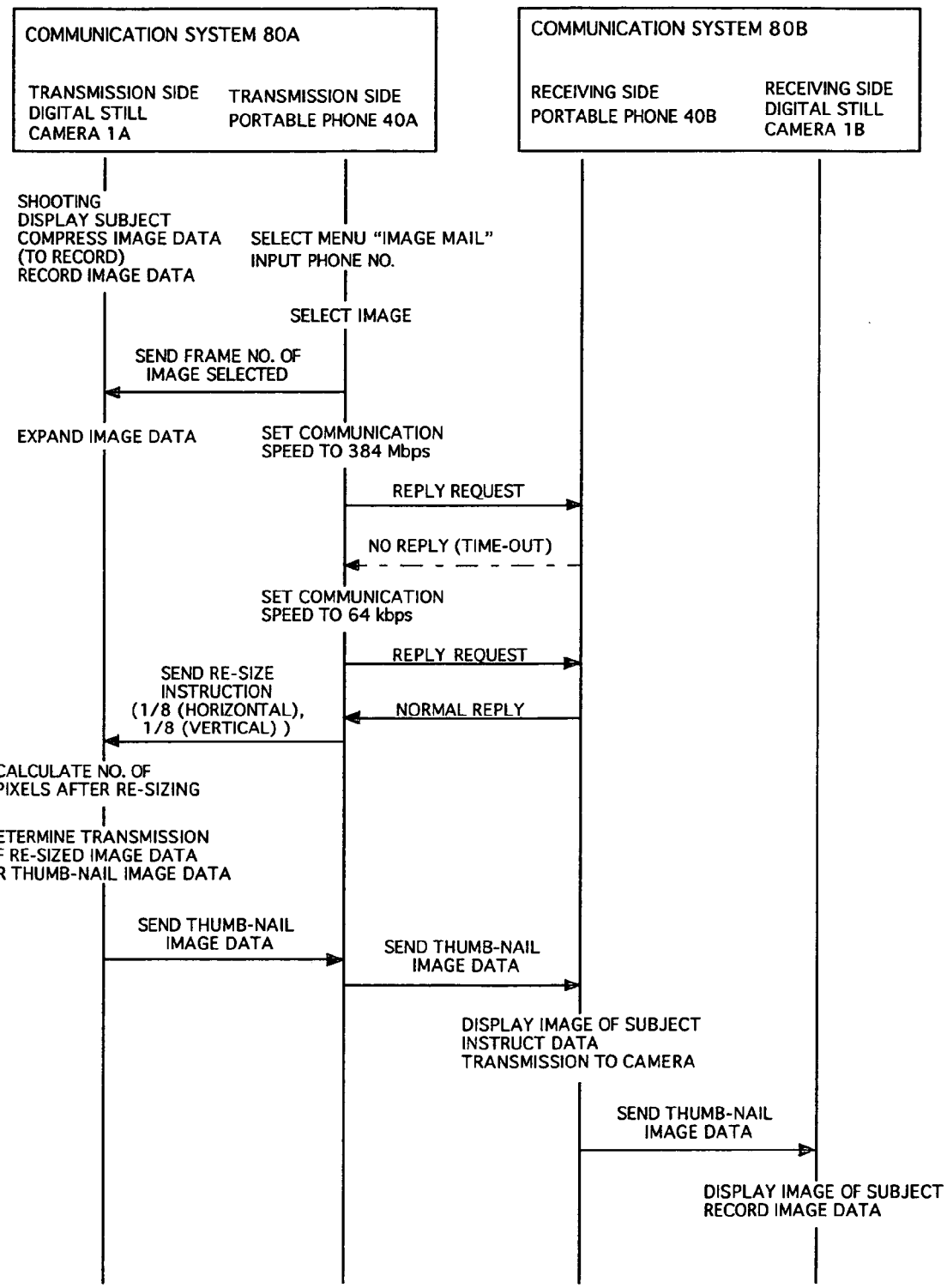
FIG. 16 is a flowchart showing a communication processing procedure of image data in a still further embodiment.

FIG. 16 shows in a flow chart another embodiment of the communication procedure between the communication systems 80A and 80B. Description will be given of discrepancy between FIG. 14 and FIG. 16. The initial communication speed is set to 384 kbps (2 Mbps in FIG. 14).

In this embodiment, the portable phone 40A on the transmission side transmits a re-size instruction to the digital still camera 1A on the transmission side.

The digital still camera 1A receives the re-size instruction and then calculates the number of pixels of the image re-sized. The number of pixels of the re-sized image is compared with that of pixels of a thumb-nail image of the image selected. It is judged whether the re-sized image data or the thumb-nail image data is transmitted according to a result of the comparison as follows.

When the difference between the number of pixels of the re-sized image and the number of pixels of the thumb-nail image is small, the thumb-nail image data is transmitted to the portable phone 40B on the receiving side through the portable phone 40A. Specifically, when the following expressions are satisfied, the thumb-nail image data is transmitted.

$$80 < Noh < 200 \qquad (1)$$

$$60 < Nov < 180 \qquad (2)$$

where, Noh indicates the number of horizontal pixels of the re-sized image and Nov is the number of vertical pixels of the re-sized image.

Assume, for example, the image selected includes 1280 horizontal pixels and 960 vertical pixels and the re-size instruction indicates to reduce the pixels to ⅛ in the horizontal and vertical directions. This results in an re-sized image including 160 (=1280/8) horizontal pixels and 120 (=960/8) vertical pixels, which satisfies expressions (1) and (2). Therefore, the thumb-nail image data is transmitted from the portable phone 40A to the portable phone 40B.

FIGS. 17 to 23 show still another embodiment.

Figure 17:
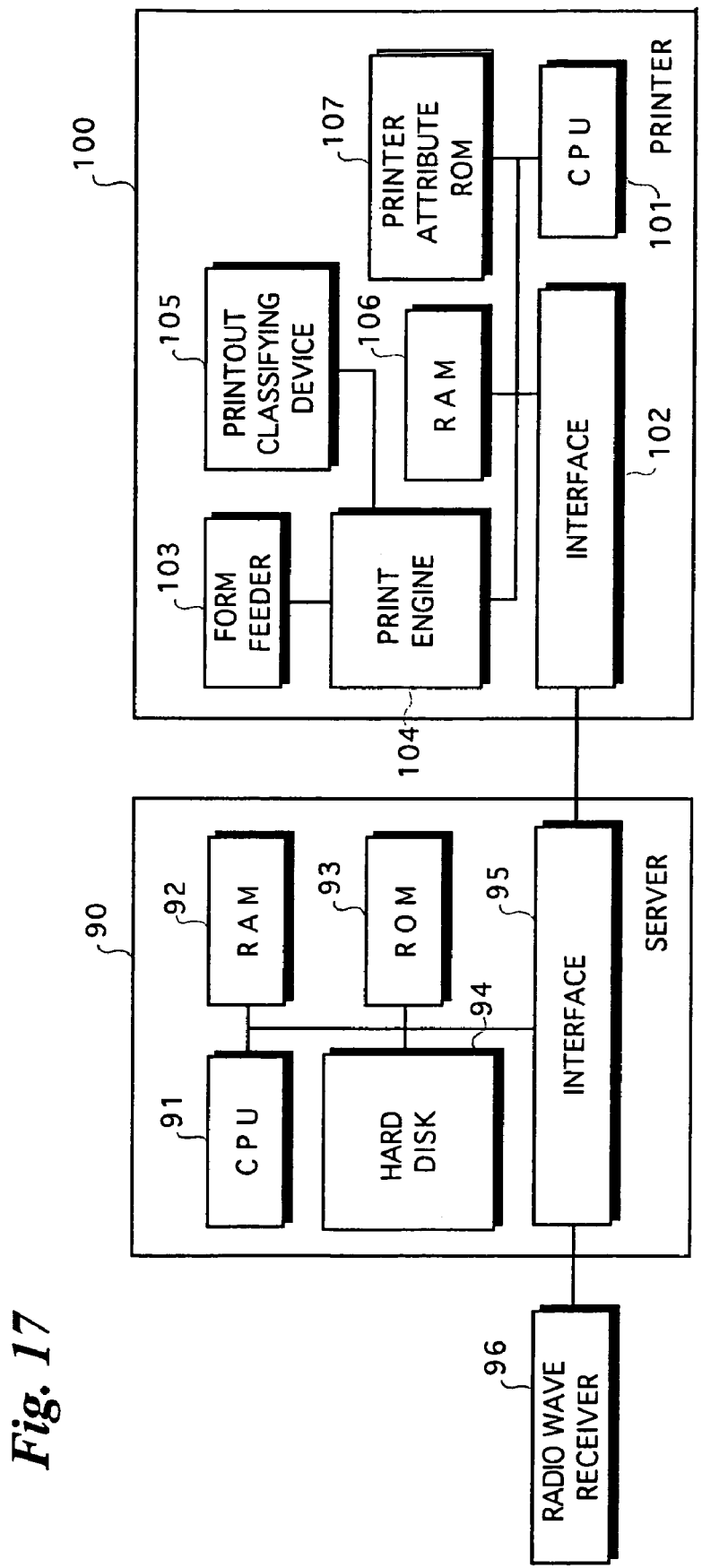
FIG. 17 is a block diagram showing electric constitution of a server and a printer.

FIG. 17 shows in a block diagram an electronic construction of the server 90 and the printer 100.

The server 90 includes a CPU 91 to control overall operation of the server 90 and a hard disk 94 to store a predetermined program and other data.

The server 90 further includes an RAM 92 to temporarily store data, an ROM 93 to store a basic input/output system (BIOS), and an interface 95 for data communication.

The server 90 is connected to a radio wave receiver 96 to communicate data with the portable phones 40A and 40B.

The server 90 thus configured is connected to the printer 100.

The printer 100 includes a CPU 101 to supervise entire operation thereof.

The printer 100 includes an interface 102 to communicate data with the server 90.

The printer 100 further includes an RAM 106 to temporarily store data, a printer attribute ROM 107 to store printer attribute information, a form (paper) feeder 103, a print engine 104, and a printout classifying device 105.

Figures 18, 19:
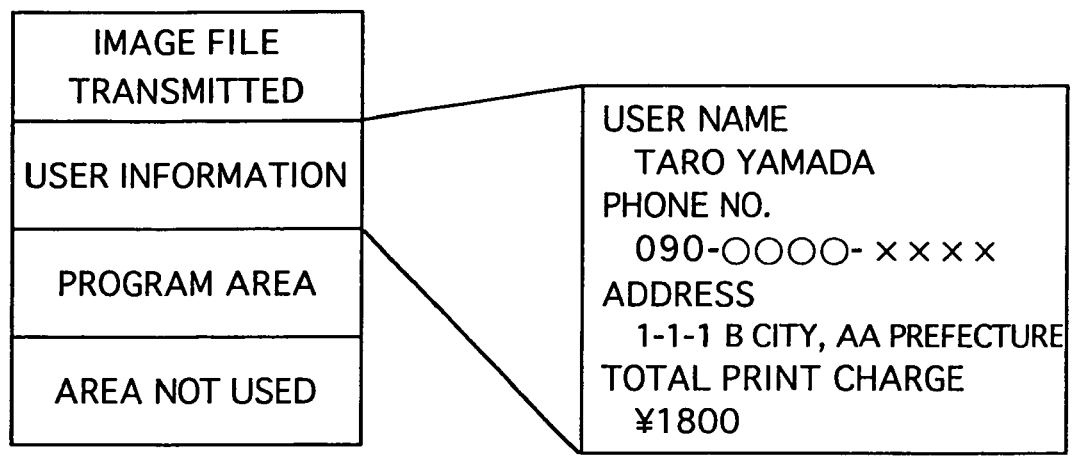
FIG. 18 is a diagram showing a data layout stored on a hard disk of a sever.
FIG. 19 is a diagram showing an example of printer attributes.

FIG. 18 shows a data layout on the hard disk 94 of the server 90.

The hard disk 94 includes an area to store image files sent from the portable phones 40A and 40B, an area to store user information, and a program area. The user information includes data items respectively indicating a name of a user authorized to access the server 90, a phone number of the user, an address of the user, and a total charge when the printer 100 is used to produce printout. The data items respectively of the user name, the phone number, and the address are registered thereto in advance.

FIG. 19 shows examples of information printer attributes stored in the printer attribute ROM 107 of the printer 100.

The printer attribute information includes data items respectively indicating a printer maker name, a printer model name, a version number, a color space which the printer can cope with, and a image data format which the printer can treat.

Figure 20:
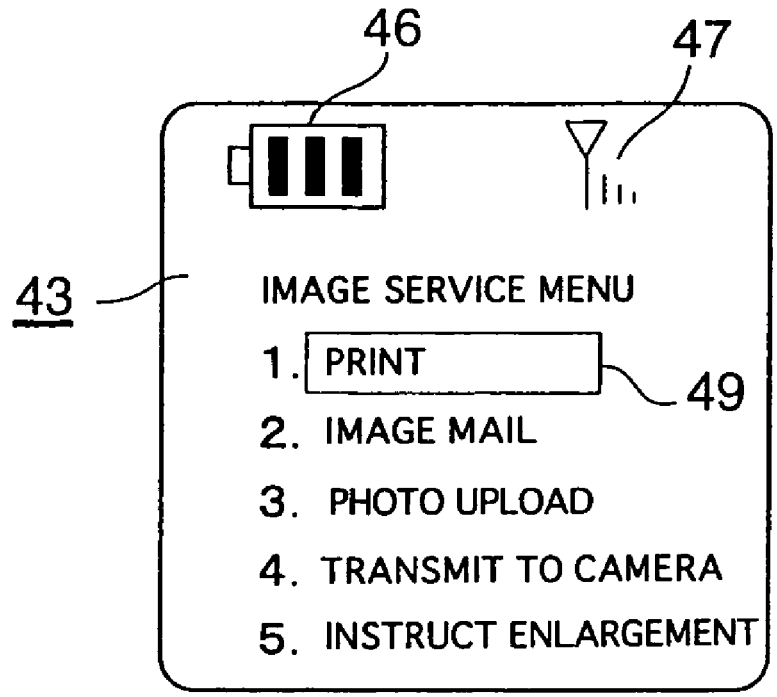
FIGS. 20 to 22 are diagrams showing examples of a display screen of a portable phone.
Figure 21:
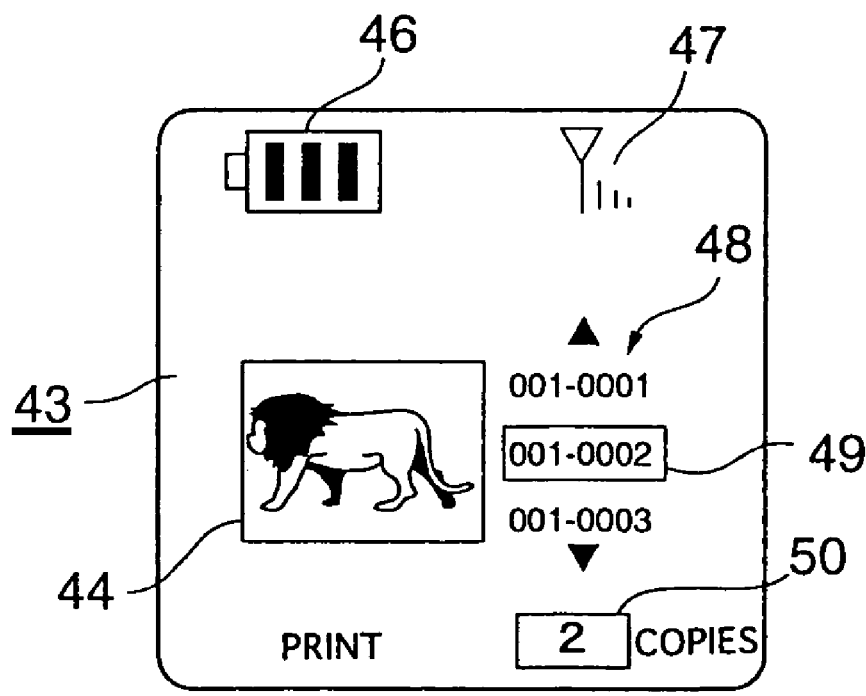
Figure 22:
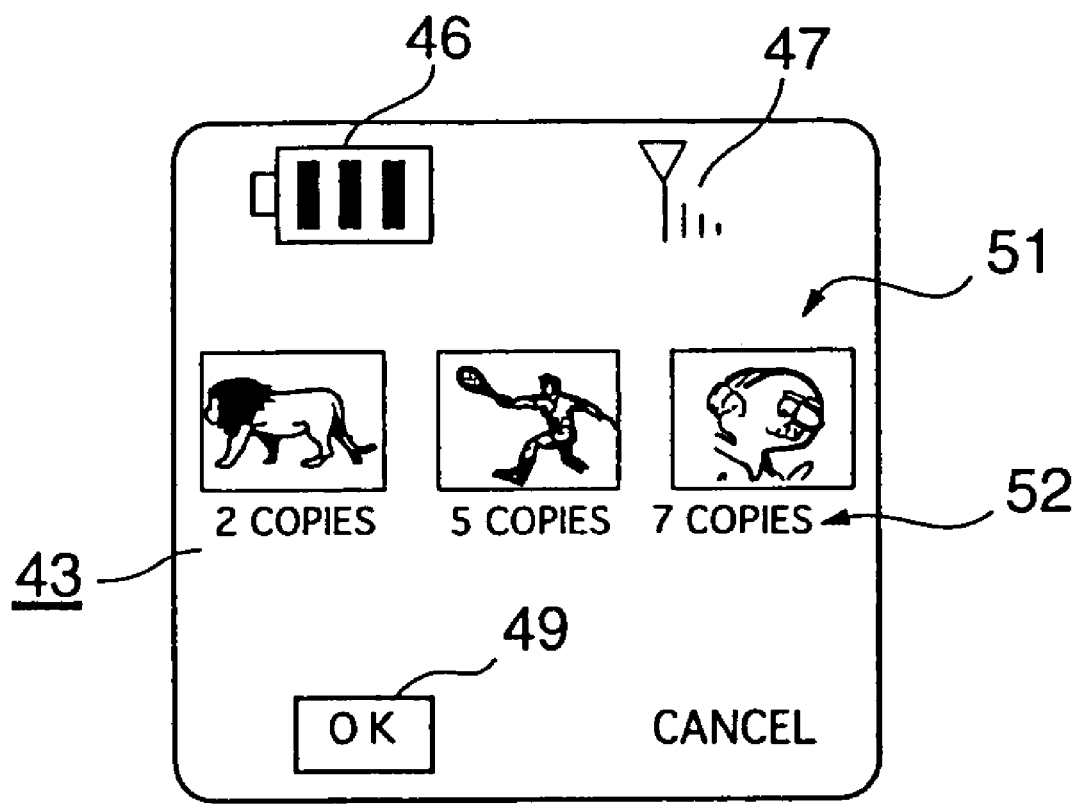

FIGS. 20 to 22 show examples of the display screen 43 of a portable phone when the user orders copies of images to be produced by the printer 100.

To order printout, the user selects "1. Image service" in the menu image shown in FIG. 6. In response to the selection, an image service menu appears on the screen of the portable phone as shown in FIG. 20. The user selects "1. Print" from the image service menu when the user desires to order print of image. The display screen of the portable phone changes to an image selection screen shown in FIG. 21.

In the image selection screen, the user encloses a frame number of an image to be printed by the cursor 49 and inputs the number of copies thereof by the ten-key unit of the portable phone. The number of copies is displayed on a number display area 50. When the user depresses the OK button 50, the screen 43 of the portable phone changes to a confirmation screen shown in FIG. 22.

The confirmation screen of FIG. 22 includes areas 51 in which images selected are displayed with areas 52 indicating respective numbers of copies respectively shown below the images.

In this situation, when the left arrow mark is depressed in the button 54, the cursor 49 enclosed an indication of "OK". When the right arrow mark is depressed in the button 54, the cursor 49 enclosed an indication of "Cancel". With "OK" enclosed by the cursor 49, when the user depresses the OK button 50, the number of copies of each image is determined. With "Cancel" enclosed by the cursor 49, when the user depresses the OK button 50, the number of copies of each image is cancelled. It may also be possible that an order of printout is cancelled only for a particular image.

Figure 23:
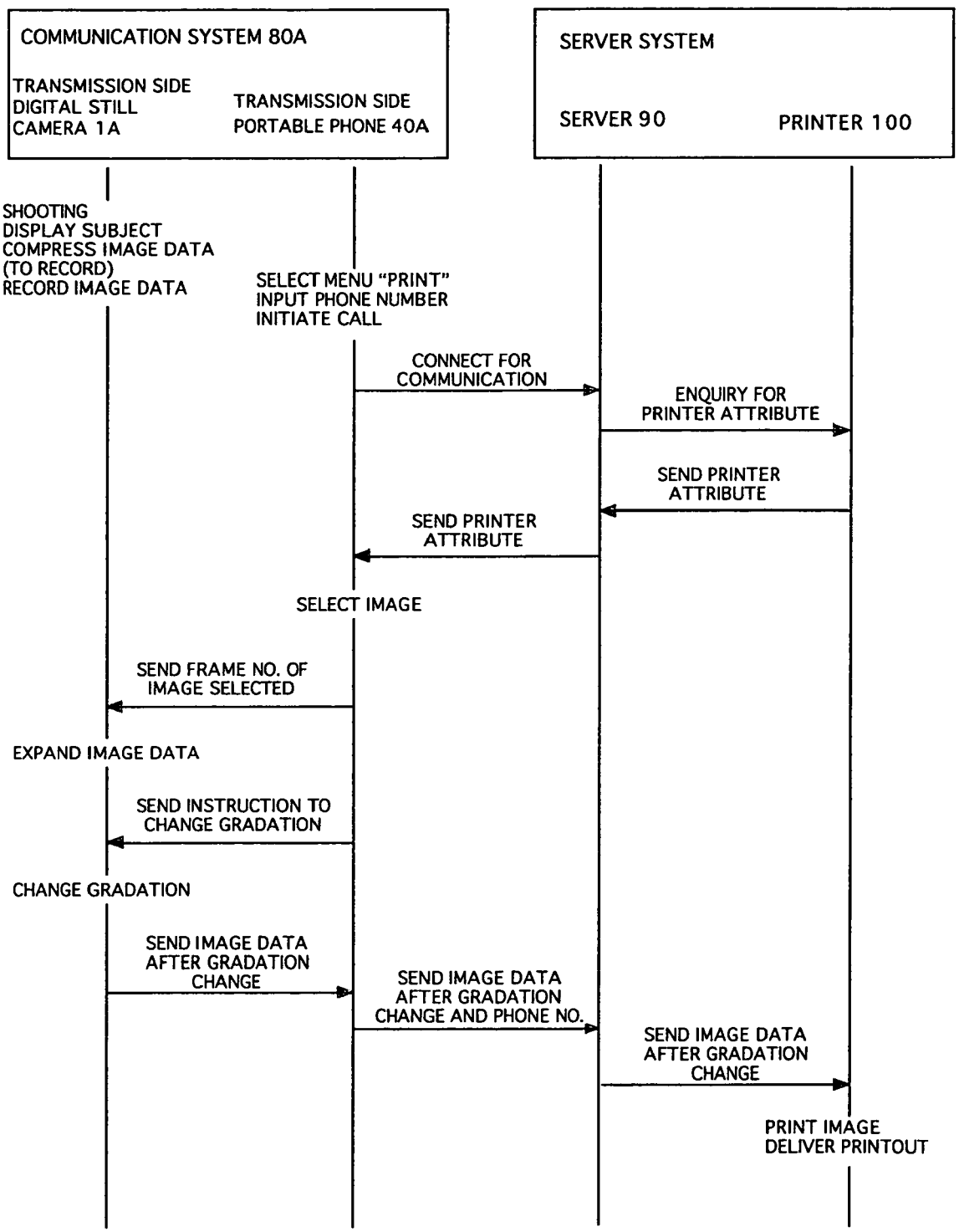
FIG. 23 is a flowchart showing a communication processing procedure of image data in still another embodiment.

FIG. 23 shows in a flowchart a communication procedure between the communication system 80A, the server 90 and the printer 100.

The portable phone 40A of the communication system 80A on the transmission side initiates connection to the server 90. When portable phone 40A is connected to the server 90, the server 90 issues an enquiry for printer attributes to the printer 100.

When the enquiry for printer attributes is received by the printer 100, data representing printer attributes is obtained from the printer attribute ROM 107 and is sent to the server 90.

Having received the printer attribute data, the server 90 sends the data to the portable phone 40A.

Images to be printed are selected by the portable phone 40A as above. Data indicating frame numbers of the selected images is sent from the portable phone 40A to the digital still camera 1A.

On receiving the data, the digital still camera 1A expands image data associated with images respectively corresponding to the frame numbers.

The portable phone 40A generates, according to the received printer attributes, a gradation change instruction to set image data suitable for the printout by the printer 100. The portable phone 40A sends data representing the gradation change instruction to the digital still camera 1A.

When the digital still camera 1A receives the data of the gradation change instruction, the change processing circuit 24 conducts a gradation change for the image data expanded. If necessary, a format conversion, a color space change and the like are achieved for the image data format so that the printer 100 appropriately processes the image data received. The image data for which the gradation change has been conducted is sent from the digital still camera 1A to the portable phone 40A.

When the portable phone 40A receives the image data, the received image data which has been subjected to the gradation change and data representing the phone number of the portable phone 40A are sent to the server 90.

Having received the image data, the server 90 transfers the image data to the printer 100. The printer 100 produces copies of image according to the specified number. The printout classifying device 105 sorts the obtained copies for each printout order. When the server 90 receives the data of the phone number, the user information stored is searched for an address of the pertinent user. The copies produced are then delivered by mail to the address of the user. It may also possible that the server 90 sends the address of the user having ordered the printout to the printer 100. Having received the address, the printer prints the address on an envelope. The printout classifying device 105 therefore sorts the envelopes together with printouts for each order of printout.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image communication system in which an image processing apparatus and a first portable phone can communicate data with each other and the first portable phone can communicate with a second portable phone via a telephone line and the first portable phone sends an image data reduction instruction to the image processing apparatus, wherein
the image processing apparatus includes:
an instruction receiving device for receiving the image data reduction instruction sent from the first portable phone;
a data quantity reducing device for reducing a data quantity of image data according to the image data reduction instruction received by the instruction receiving device; and
a first image data transmitting device for transmitting, to the first portable phone, the image data of which the data quantity is reduced by the data quantity reducing device and
the first portable phone includes:
an image data receiving device for receiving the image data sent from the first image data transmitting device of the image processing apparatus; and
a second image data transmitting device for transmitting via the telephone line the image data received by the image data receiving device, wherein
at least one of the first portable phone and the image processing apparatus includes a detecting element for detecting a data communication speed on the telephone line that connects the first portable phone with the second portable phone, and
the data quantity reducing device of the image processing apparatus increases a quantity of data reduction when a slower communication speed is detected by the detecting element.

2. An image communication system in which an image processing apparatus and a first portable phone can communicate data with each other and the first portable phone can communicate with a second portable phone via a telephone line and the first portable phone sends an image data reduction instruction to the image processing apparatus, wherein
the image processing apparatus includes:
an instruction receiving device for receiving the image data reduction instruction sent from the first portable phone;
a data quantity reducing device for reducing a data quantity of image data according to the image data reduction instruction received by the instruction receiving device; and
a first image data transmitting device for transmitting, to the first portable phone, the image data of which the data quantity is reduced by the data quantity reducing device and
the first portable phone includes:
an image data receiving device for receiving the image data sent from the first image data transmitting device of the image processing apparatus; and
a second image data transmitting device for transmitting via the telephone line the image data received by the image data receiving device, wherein
the image data of which the data quantity is to be reduced is associated with thumbnail data,
the image processing apparatus further includes a comparing device for comparing the data quantity of the image data after the reduction of image data by the data quantity reducing device and the data quantity of the thumbnail image data,
the first image transmitting device of the image processing apparatus transmits the thumbnail image data when the data quantity of the image data after the reduction of image data by the data quantity reducing device is in the vicinity of a data quantity of the thumbnail image data.

3. An image communication system in which an image processing apparatus and a first portable phone can communicate data with each other and the first portable phone can communicate with a second portable phone via a telephone line and the first portable phone sends an image data reduction instruction to the image processing apparatus, wherein
the image processing apparatus includes:
an instruction receiving device for receiving the image data reduction instruction sent from the first portable phone;
a data quantity reducing device for reducing a data quantity of image data according to the image data reduction instruction received by the instruction receiving device; and
a first image data transmitting device for transmitting, to the first portable phone, the image data of which the data quantity is reduced by the data quantity reducing device and
the first portable phone includes:
an image data receiving device for receiving the image data sent from the first image data transmitting device of the image processing apparatus; and
a second image data transmitting device for transmitting via the telephone line the image data received by the image data receiving device, wherein
the first portable phone further includes a device for transmitting a transmission instruction of image data for printout to the image processing apparatus,
the image processing apparatus further includes:
a device for receiving the print image data transmission instruction transmitted from the first portable phone; and
a terminating device for terminating the data quantity reduction processing by the image data quantity reducing device in response to reception of the print image data transmission instruction; and
wherein the first image data transmitting device transmits the image data before the data quantity reduction processing to the first portable phone when the data quantity reduction processing is terminated by the terminating device.

* * * * *